(12) United States Patent
Kamiya

(10) Patent No.: US 11,784,687 B2
(45) Date of Patent: Oct. 10, 2023

(54) RECEPTION APPARATUS, SIGNAL PROCESSING METHOD, AND NON-TRANSITORY COMPUTER READABLE RECORDING MEDIUM

(71) Applicant: NEC Corporation, Tokyo (JP)

(72) Inventor: Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/743,680

(22) Filed: May 13, 2022

(65) Prior Publication Data

US 2022/0376752 A1 Nov. 24, 2022

(30) Foreign Application Priority Data

May 20, 2021 (JP) ................................. 2021-085351

(51) Int. Cl.
*H04B 7/02* (2018.01)
*H04B 7/0456* (2017.01)
(Continued)

(52) U.S. Cl.
CPC ......... *H04B 7/0456* (2013.01); *H04B 1/1027* (2013.01); *H04L 25/0202* (2013.01)

(58) Field of Classification Search
CPC . H04B 7/0456; H04B 1/1027; H04L 25/0202; Y02D 30/70

(Continued)

(56) References Cited

U.S. PATENT DOCUMENTS 5,271,038 A * 12/1993 Cai ...................... H04B 1/1027
327/309
6,424,635 B1 * 7/2002 Song ...................... H04B 3/23
379/406.01

(Continued)

FOREIGN PATENT DOCUMENTS

| CN | 103685117 | * | 3/2014 |
| JP | 2009-194732 | | 8/2009 |
| WO | 2019/116774 | | 6/2019 |

OTHER PUBLICATIONS

M. Hirabe, R. Zenkyu, H. Miyamoto, K. Ikuta, and E. Sasaki, "40m transmission of OAM mode and polarization multiplexing in E-band," 2019 IEEE Global Communication Conference (GLOBECOM), Dec. 2019.

*Primary Examiner* — Helene E Tayong

(57) ABSTRACT

In order to achieve both of reduction of peak power and reduction of a transmission rate, an apparatus includes a reception processing unit configured to receive transmission signals from a transmission apparatus, the transmission apparatus performing precoding processing and clipping processing on the transmission signals and outputting a plurality of the transmission signals simultaneously in an identical frequency band; a signal separating unit configured to separate reception data sets from the transmission signals; and a transmission signal estimating unit configured to estimate a signal distortion component and a noise component due to the clipping processing and an interference component between the transmission signals, based on the reception data sets and gain information related to a channel for transmitting the transmission signals, and estimate transmission data sets by removing the signal distortion component, the noise component, and the interference component being estimated from the reception data sets.

9 Claims, 14 Drawing Sheets

(51) Int. Cl.
*H04L 25/02* (2006.01)
*H04B 1/10* (2006.01)
(58) Field of Classification Search
USPC .......................................................... 375/267
See application file for complete search history.

(56) References Cited

U.S. PATENT DOCUMENTS

2009/0207931 A1    8/2009  Ohwatari et al.
2018/0294894 A1* 10/2018  Matsubara ............ H04B 17/345
2021/0075478 A1    3/2021  Zenkyu et al.

* cited by examiner

RECEPTION APPARATUS, SIGNAL PROCESSING METHOD, AND NON-TRANSITORY COMPUTER READABLE RECORDING MEDIUM

This application claims priority based on JP 2021-85351 filed on May 20, 2021, the entire disclosure of which is incorporated herein.

BACKGROUND

Technical Field

The present disclosure relates to a reception apparatus, a signal processing method, and a non-transitory computer readable recording medium.

Background Art

In recent years, in a line-of-sight (LOS) communication system in which communication is performed using a high frequency band of micro waves or millimeter waves or higher, increase of transmission capacity has been required along with increase of a demand as mobile communication infrastructure. As a technique that implements increase of transmission capacity, multi-input multi-output (MIMO) transmission technology using a plurality of transmission antennas and reception antennas has been known. Further, in the MIMO transmission technology, OAM-MIMO transmission technology has been attracting attention, which uses MIMO technology to implement a transmission method for increasing the capacity by multiplexing a large number of signals through utilization of orbital angular momentum (OAM) of electromagnetic waves.

For example, in NPL 1 listed below, a technology that implements OAM-MIMO transmission by using transmission antennas and reception antennas in which a plurality of antenna elements are concentrically disposed is disclosed. In NPL 1, multiplexing transmission similar to OAM transmission is implemented as follows: signals are multiplexed through utilization of an OAM transmission mode of electromagnetic waves by performing precoding processing on the signals transmitted through a plurality of concentrically disposed antenna elements. A reception apparatus can receive the signals without interfering with the signals propagating from the concentric antenna elements by applying inverse transform for the precoding processing performed in a transmission apparatus.

In the MIMO transmission technology including the OAM transmission, it is expected that spectral efficiency is significantly enhanced and the capacity of communication is thereby increased through combination with multi-level quadrature amplitude modulation (QAM), polarization multiplexing technology, or the like. One of issues therefor is to reduce peak power of each transmission signal output from the plurality of antenna elements.

In the MIMO transmission, for the sake of efficient use of channels, in general, precoding processing is performed on transmission signals. For example, in the OAM-MIMO transmission described above, signals are input to an antenna after precoding processing implemented in inverse discrete Fourier transform is performed on the signals. Such precoding processing is required for transmitting signals through concentric antenna elements without interference. At the same time, however, the precoding processing causes increase of the ratio between peak power and average power (peak to average power ratio, which may be hereinafter referred to as "PAPR") due to combining of a plurality of signals. Since the increase of the PAPR is a cause of reduction of use efficiency of a power amplifier (power amp) attached to a transmission antenna, reduction of the PAPR is required.

As a technique that aims to reduce the PAPR, for example, in JP 2009-194732 A (PTL 1), in the MIMO transmission, a method in which phase rotation processing is performed in a previous process of the precoding processing is disclosed. Further, in WO 2019-116774 (PTL 2), regarding the OAM-MIMO transmission, a method in which the phase rotation processing is performed in a previous process of the precoding processing implemented in inverse discrete Fourier transform is disclosed.

[NPL 1] M. Hirabe, R. Zenkyu, H. Miyamoto, K. Ikuta, and E. Sasaki, "40 m transmission of OAM mode and polarization multiplexing in E-band," 2019 IEEE Global Communication Conference (GLOBECOM), December 2019.
[PTL 1] JP 2009-194732 A
[PTL 2] WO 2019-116774

SUMMARY

However, in order to implement the reduction effect of the PAPR by applying the phase rotation processing disclosed in PTLs 1 and 2, a process of first preparing a large number of phase rotation patterns and then selecting a phase rotation pattern having the smallest peak power out of these phase rotation patterns is needed. In addition, when transmission data is restored in the reception apparatus, information of phase rotation performed in the transmission apparatus is needed. Accordingly, it is necessary to transmit information of phase rotation performed in the transmission apparatus other than data that is originally transmitted from the transmission apparatus. In this manner, in PTLs 1 and 2, there is a problem in that reduction of a transmission rate is caused by, for example, complication of system operation and transmission of redundant information.

The present disclosure is made in order to solve the issue described above, and has an example object to provide a reception apparatus, a transmission and reception system, a signal processing method, and a signal processing program that can achieve both of reduction of peak power and reduction of a transmission rate.

A reception apparatus according to the present disclosure includes: a reception processing unit configured to receive transmission signals from a transmission apparatus, the transmission apparatus performing clipping processing for removing amplitude equal to or larger than a threshold on the transmission signals generated by performing precoding processing on two or more integer transmission data sets and outputting a plurality of the transmission signals simultaneously or substantially simultaneously in an identical frequency band; a signal separating unit configured to separate as many reception data sets as number of the transmission data sets from the transmission signals by performing inverse transform for the precoding processing on the received transmission signals; and a transmission signal estimating unit configured to estimate a signal distortion component and a noise component due to the clipping processing and an interference component between the transmission signals based on the reception data sets and gain information related to a channel for transmitting the transmission signals, and estimate the transmission data sets by removing the signal distortion component, the noise component, and the interference component being estimated from the reception data sets.

A signal processing method according to the present disclosure includes: receiving transmission signals from a transmission apparatus, the transmission apparatus performing clipping processing for removing amplitude equal to or larger than a threshold on the transmission signals generated by performing precoding processing on two or more integer transmission data sets and outputting a plurality of the transmission signals simultaneously or substantially simultaneously in an identical frequency band; separating as many reception data sets as number of the transmission data sets from the transmission signals by performing inverse transform for the precoding processing on the received transmission signals; and estimating a signal distortion component and a noise component due to the clipping processing and an interference component between the transmission signals based on the reception data sets and gain information related to a channel for transmitting the transmission signals, and estimating the transmission data sets by removing the signal distortion component, the noise component, and the interference component being estimated from the reception data sets.

A non-transitory computer readable recording medium storing a signal processing program according to the present disclosure causes a processor to execute: receiving transmission signals from a transmission apparatus, the transmission apparatus performing clipping processing for removing amplitude equal to or larger than a threshold on the transmission signals generated by performing precoding processing on two or more integer transmission data sets and outputting a plurality of the transmission signals simultaneously or substantially simultaneously in an identical frequency band; separating as many reception data sets as number of the transmission data sets from the transmission signals by performing inverse transform for the precoding processing on the received transmission signals; and estimating a signal distortion component and a noise component due to the clipping processing and an interference component between the transmission signals based on the reception data sets and gain information related to a channel for transmitting the transmission signals, and estimating the transmission data sets by removing the signal distortion component, the noise component, and the interference component being estimated from the reception data sets.

According to the present disclosure, the reception apparatus, the transmission and reception system, the signal processing method, and the signal processing program that can achieve both of reduction of peak power and reduction of a transmission rate can be provided. Note that, according to the present disclosure, instead of or together with the above effects, other effects may be exerted.

DESCRIPTION OF THE EXAMPLE EMBODIMENTS

Figure 1:
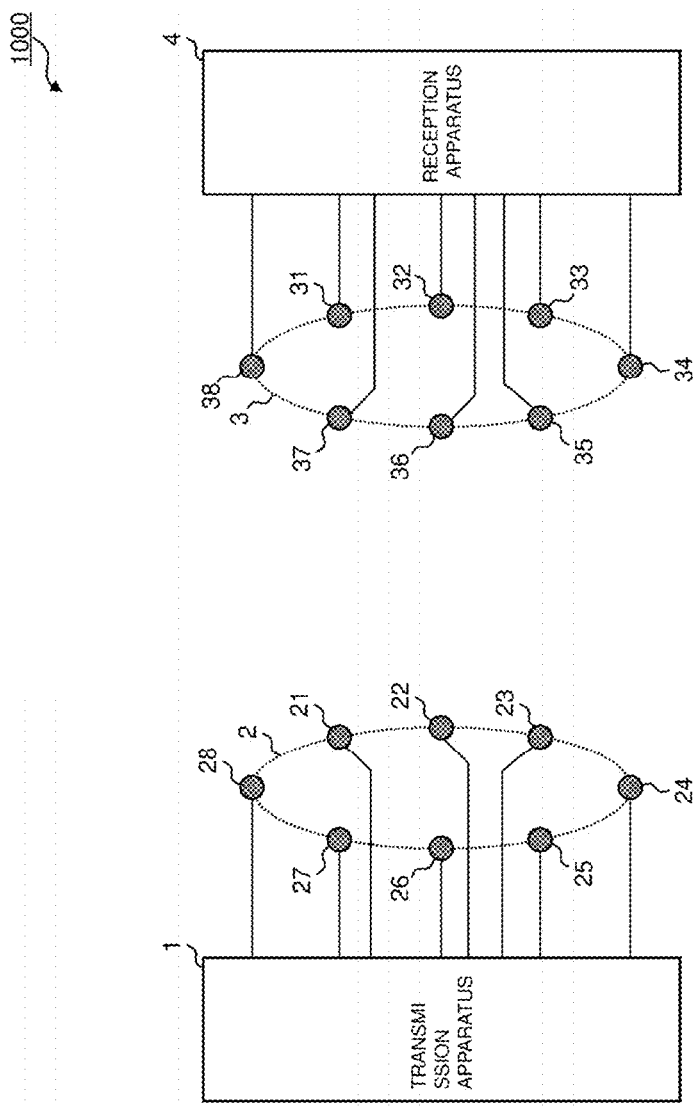
FIG. 1 is a diagram illustrating an operation mode of a transmission and reception system according to a first example embodiment.

Hereinafter, example embodiments of the present disclosure will be described in detail with reference to the accompanying drawings. Note that, in the Specification and drawings, elements to which similar descriptions are applicable are denoted by the same or corresponding reference signs, and overlapping descriptions may hence be omitted.

Each of the example embodiments described below is merely an example of a configuration that can be implement the present disclosure. Each of the example embodiments described below can be modified or changed as appropriate according to the configuration and various conditions of an apparatus to which the present disclosure is applied. Not necessarily all of the combinations of the elements included in each of the example embodiments described below is required to implement the present disclosure, and a part of the elements can be omitted as appropriate. Thus, the scope of the present disclosure is not limited by configurations described in each of the example embodiments described below. Configurations in which a plurality of configurations described in the example embodiments are combined can also be adopted unless the configurations are inconsistent with each other.

Descriptions will be given in the following order.
1. Overview of Example Embodiments of Present Disclosure
2. First Example Embodiment
    2.1. Operation Mode of Transmission and Reception System 2.2. Hardware Configuration of Signal Processing Apparatus
2.3. Functional Configuration of Transmission Apparatus
2.4. Functional Configuration of Reception Apparatus
2.5. Flow of Processing in Transmission Apparatus
2.6. Flow of Processing in Reception Apparatus
2.7. Flow of Processing of Estimating Transmission Data Set
2.8. Peak Power Reduction Effect
3. Second Example Embodiment
4. Other Example Embodiments

1. OVERVIEW OF EXAMPLE EMBODIMENTS OF PRESENT DISCLOSURE

First, an overview of example embodiments of the present disclosure will be described.
(1) Technical Issue In recent years, in a line-of-sight (LOS) communication system in which communication is performed using a high frequency band of micro waves or millimeter waves or higher, increase of transmission capacity has been required along with increase of a demand as mobile communication infrastructure. As a technique that implements increase of transmission capacity, multi-input multi-output (MIMO) transmission technology using a plurality of transmission antennas and reception antennas has been known. Further, in the MIMO transmission technology, OAM-MIMO transmission technology has been attracting attention, which uses MIMO technology to implement a transmission method for increasing the capacity by multiplexing a large number of signals through utilization of orbital angular momentum (OAM) of electromagnetic waves.

For example, a technology that implements OAM-MIMO transmission by using transmission antennas and reception antennas in which a plurality of antenna elements are concentrically disposed is disclosed. In NPL 1, multiplexing transmission similar to OAM transmission is implemented as follows: signals are multiplexed through utilization of an OAM transmission mode of electromagnetic waves by performing precoding processing on the signals transmitted through a plurality of concentrically disposed antenna elements. A reception apparatus can receive the signals without interfering with the signals propagating from the concentric antenna elements by applying inverse transform for the precoding processing performed in a transmission apparatus.

In the MIMO transmission technology including the OAM transmission, it is expected that spectral efficiency is significantly enhanced and the capacity of communication is thereby increased through combination with multi-level quadrature amplitude modulation (QAM), polarization multiplexing technology, or the like. One of issues therefor is to reduce peak power of each transmission signal output from the plurality of antenna elements.

In the MIMO transmission, for the sake of efficient use of channels, in general, precoding processing is performed on transmission signals. For example, in the OAM-MIMO transmission described above, signals are input to an antenna after precoding processing implemented in inverse discrete Fourier transform is performed on the signals. Such precoding processing is required for transmitting signals through concentric antenna elements without interference. At the same time, however, the precoding processing causes increase of the ratio between peak power and average power (peak to average power ratio, which may be hereinafter referred to as "PAPR") due to combining of a plurality of signals. Since the increase of the PAPR is a cause of reduction of use efficiency of a power amplifier (power amp) attached to a transmission antenna, reduction of the PAPR is required.

As a technique that aims to reduce the PAPR, for example, in the MIMO transmission, a method in which phase rotation processing is performed in a previous process of the precoding processing is disclosed. Further, for example, regarding the OAM-MIMO transmission, a method in which the phase rotation processing is performed in a previous process of the precoding processing implemented in inverse discrete Fourier transform is disclosed.

However, in order to implement the reduction effect of the PAPR by applying the phase rotation processing in the technique described above, a process of first preparing a large number of phase rotation patterns and then selecting a phase rotation pattern having the smallest peak power out of these phase rotation patterns is needed. In addition, when transmission data is restored in the reception apparatus, information of phase rotation performed in the transmission apparatus is needed. Accordingly, it is necessary to transmit information of phase rotation performed in the transmission apparatus other than data that is originally transmitted from the transmission apparatus. In this manner, in the techniques described above, there is a problem in that reduction of a transmission rate is caused by, for example, complication of system operation and transmission of redundant information.

In view of the circumstances described above, the present disclosure has an example object to provide a reception apparatus, a transmission and reception system, a signal processing method, and a signal processing program that can achieve both of reduction of peak power and reduction of a transmission rate.
(2) Technical Features In the example embodiments of the present disclosure, for example, a reception apparatus includes: a reception processing unit configured to receive transmission signals from a transmission apparatus, the transmission apparatus performing clipping processing for removing amplitude equal to or larger than a threshold on the transmission signals generated by performing precoding processing on two or more integer transmission data sets and outputting a plurality of the transmission signals simultaneously or substantially simultaneously in an identical frequency band; a signal separating unit configured to separate as many reception data sets as number of the transmission data sets from the transmission signals by performing inverse transform for the precoding processing on the received transmission signals; and a transmission signal estimating unit configured to estimate a signal distortion component and a noise component due to the clipping processing and an interference component between the transmission signals based on the reception data sets and gain information related to a channel for transmitting the transmission signals, and estimate the transmission data sets by removing the signal distortion component, the noise component, and the interference component being estimated from the reception data sets.

With this configuration, the reception apparatus that can achieve both of reduction of peak power and reduction of a transmission rate can be provided. Note that the technical features described above are merely a specific example of the example embodiments of the present disclosure, and as a matter of course, the example embodiments of the present disclosure are not limited to the technical features described above.

2. FIRST EXAMPLE EMBODIMENT

<2.1. Operation Mode of Transmission and Reception System>

First, with reference to FIG. 1, an operation mode of a transmission and reception system 1000 according to a first example embodiment of the present disclosure will be described. FIG. 1 is a diagram illustrating an operation mode of the transmission and reception system 1000 according to the first example embodiment. The transmission and reception system 1000 includes a transmission apparatus 1 (transmitter), a transmission antenna unit 2, a reception antenna unit 3, and a reception apparatus 4 (receiver).

The transmission apparatus 1 inputs signals to be transmitted to the transmission antenna unit 2. The transmission apparatus 1 performs precoding processing and clipping processing on the signals to be transmitted, and inputs signals after the precoding processing and the clipping processing to the transmission antenna unit 2. The precoding processing is processing performed for the purpose of suppressing interference between signals when the signals are transmitted through antenna elements disposed concentrically. The clipping processing is processing performed for the purpose of suppressing power for amplifying the signals to be transmitted by removing amplitude equal to or larger than a predetermined threshold. The details of the precoding processing and the clipping processing performed by the transmission apparatus 1 will be described later.

The transmission antenna unit 2 includes antenna elements 21, 22, 23, 24, 25, 26, 27, and 28 that are concentrically disposed. The transmission apparatus 1 inputs signals to each of the antenna elements 21, 22, 23, 24, 25, 26, 27, and 28. Each of the antenna elements 21, 22, 23, 24, 25, 26, 27, and 28 emits the signals input from the transmission apparatus 1 to a space. Each of the antenna elements 21, 22, 23, 24, 25, 26, 27, and 28 can simultaneously or substantially simultaneously emit the signals input from the transmission apparatus 1. Note that the number of antenna elements included in the transmission antenna unit 2 may be a number other than the number illustrated in FIG. 1.

The reception antenna unit 3 includes antenna elements 31, 32, 33, 34, 35, 36, 37, and 38 that are concentrically disposed. Signals received by the antenna elements 31, 32, 33, 34, 35, 36, 37, and 38 are input to the reception apparatus 4. Note that the number of antenna elements included in the reception antenna unit 3 may be a number other than the number illustrated in FIG. 1.

The reception apparatus 4 performs processing corresponding to inverse transform for the precoding processing performed in the transmission apparatus 1 on the signals received by the antenna elements 31, 32, 33, 34, 35, 36, 37, and 38. The reception apparatus 4 estimates the signals transmitted from the transmission apparatus 1 based on the signals after the inverse transform and gain information of a channel for transmitting the signals, and outputs the estimated signals.

As illustrated in FIG. 1, the transmission and reception system 1000 corresponds to an OAM-MIMO transmission system being an example of a MIMO transmission system that includes eight antenna elements each disposed evenly in a circular manner in a transmitter and a receiver.

In the MIMO transmission, for the sake of efficient use of channels, in general, precoding processing is performed on signals to be transmitted. At the same time, however, the precoding processing increases the ratio between peak power and average power (PAPR) due to combining of a plurality of signals. Since the increase of the PAPR is a cause of reduction of use efficiency of a power amplifier attached to a transmission antenna, reduction of the PAPR is required.

With the aim of reducing the PAPR, a method of performing phase rotation in a transmitter has hitherto been attempted. In such a method, it is necessary to transmit information of phase rotation performed on the transmission apparatus in addition to the signals to be transmitted from the transmission apparatus, and thus there is an issue in that reduction of a transmission rate is caused by, for example, complication of system operation and transmission of redundant information.

To address such an issue, the present example embodiment provides description of a transmission and reception system that can achieve both of reduction of peak power and reduction of a transmission rate.

<2.2. Hardware Configuration of Signal Processing Apparatus>

Figure 2:
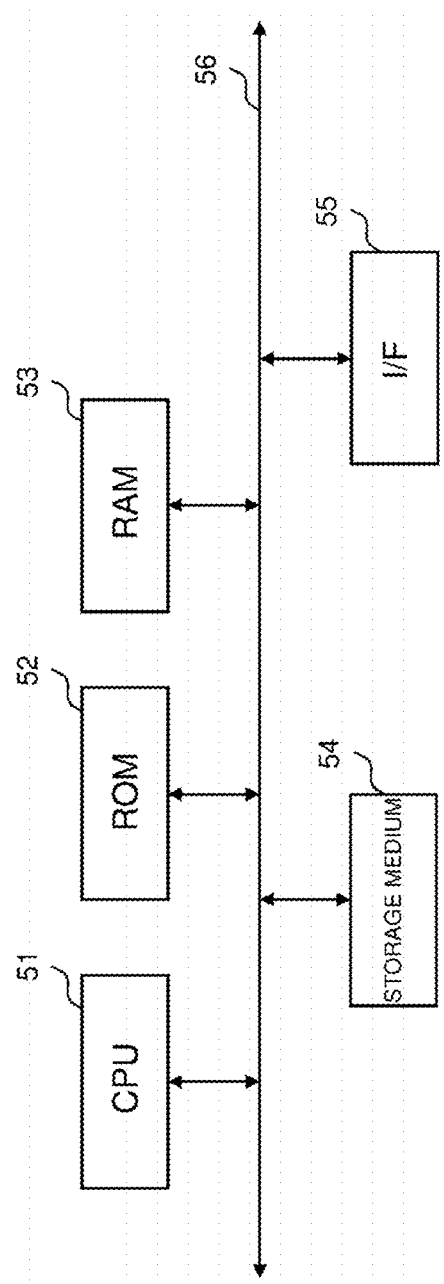
FIG. 2 is a diagram illustrating a hardware configuration of a signal processing apparatus according to the first example embodiment.

Next, a hardware configuration of a signal processing apparatus such as the transmission apparatus 1 and the reception apparatus 4 according to the present example embodiment will be described. FIG. 2 is a block diagram illustrating a hardware configuration of a signal processing apparatus.

In the signal processing apparatus, a central processing unit (CPU) 51, a read only memory (ROM) 52, a random access memory (RAM) 53, a storage medium 54, and an interface (I/F) 55 are connected to each other via a bus 56. Note that the signal processing apparatus may include an input apparatus such as a keyboard and a mouse or a display apparatus such as a display in addition to the elements illustrated in FIG. 2.

The CPU 51 is an arithmetic means, and controls operation of the entire signal processing apparatus. The RAM 53 is a volatile storage medium capable of rapid reading and writing of information, and is used as a working area when the CPU 51 processes information. The ROM 52 is a read-only non-volatile storage medium, and programs such as firmware are stored therein. The storage medium 54 is a non-volatile storage medium capable of reading and writing of information, such as a hard disk drive (HDD), and an OS, various control programs, application programs, and the like are stored therein. The I/F 55 connects and controls the bus 56 and various pieces of hardware.

In such a hardware configuration, a software control unit of the transmission apparatus 1 is configured by the CPU 51 of the transmission apparatus 1 performing arithmetic operation in accordance with the program stored in the ROM 52 of the transmission apparatus 1 or the program loaded from the storage medium 54 of the transmission apparatus 1 into the RAM 53 of the transmission apparatus 1. With a combination of the software control unit configured as described above and the hardware, functional blocks that implements the functions of the transmission apparatus 1 (see FIG. 3) is configured.

In such a hardware configuration, a software control unit of the reception apparatus 4 is configured by the CPU 51 of the reception apparatus 4 performing arithmetic operation in accordance with the program stored in the ROM 52 of the reception apparatus 4 or the program loaded from the storage medium 54 of the reception apparatus 4 into the RAM 53 of the reception apparatus 4. With a combination of the software control unit configured as described above and the hardware, functional blocks that implements the functions of the reception apparatus 4 (see FIG. 4 to FIG. 6) is configured.

<2.3. Functional Configuration of Transmission Apparatus>

Figure 3:
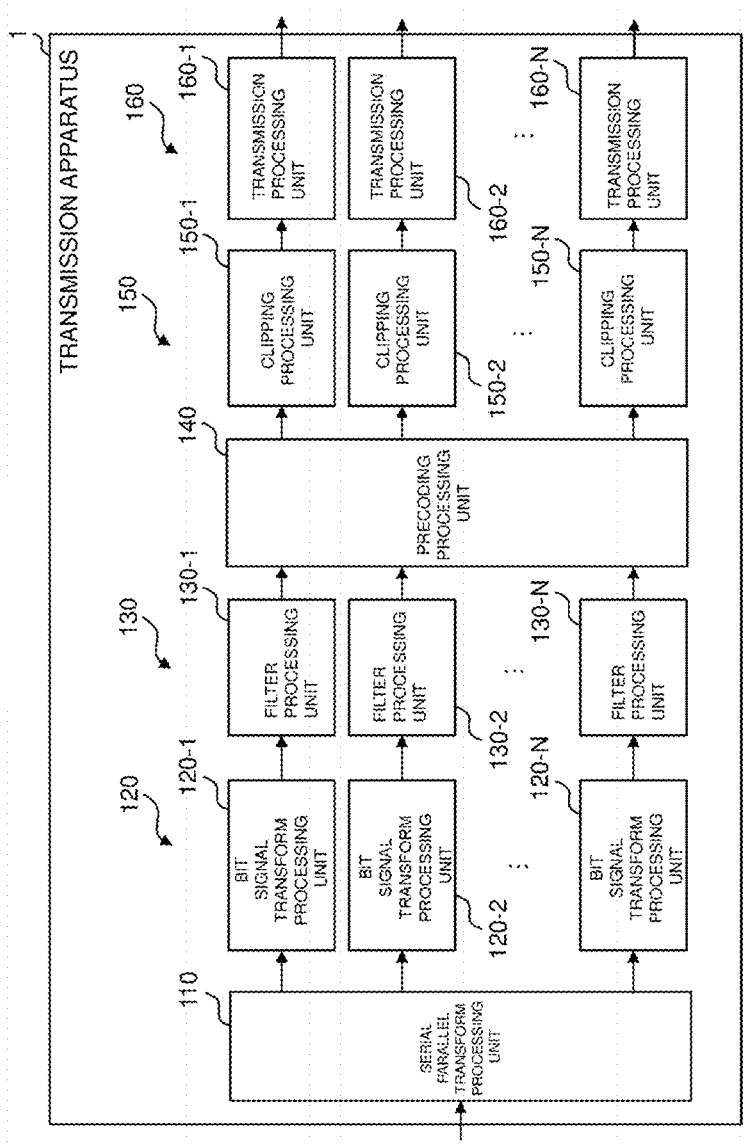
FIG. 3 is a functional block diagram illustrating a functional configuration of a transmission apparatus according to the first example embodiment.
Figure 4:
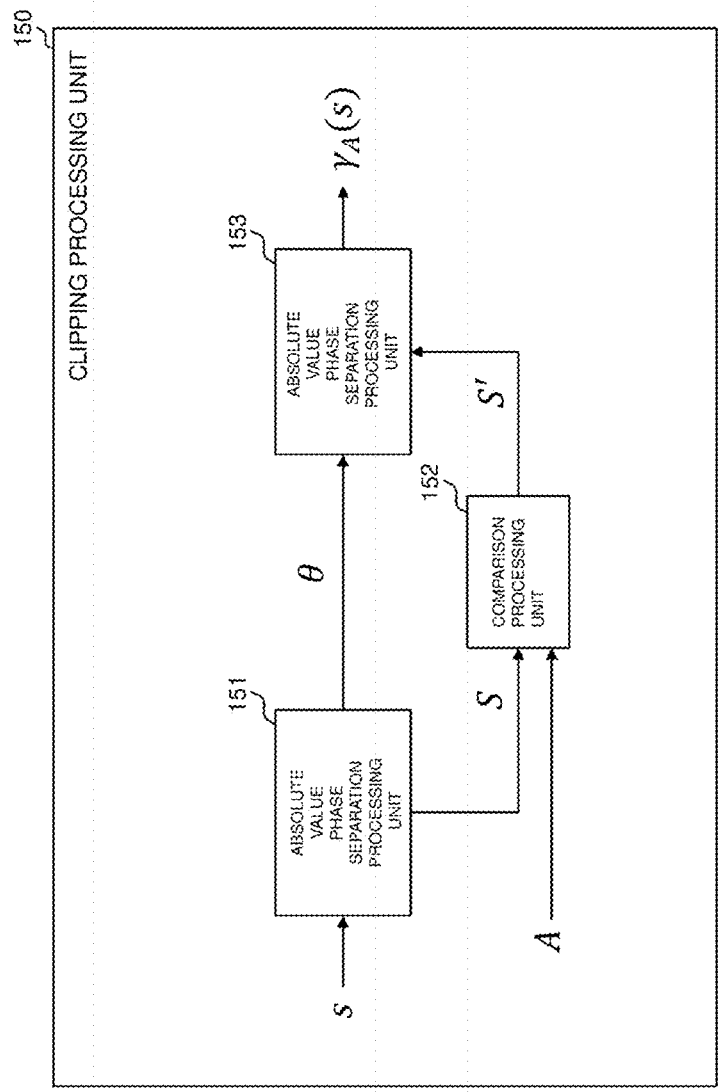
FIG. 4 is a functional block diagram illustrating a functional configuration of a clipping processing unit according to the first example embodiment.

Next, with reference to FIG. 3 and FIG. 4, a functional configuration of the transmission apparatus 1 will be described. FIG. 3 is a functional block diagram illustrating a functional configuration of the transmission apparatus 1 according to the first example embodiment. FIG. 4 is a functional block diagram illustrating a functional configuration of a clipping processing unit 150 of the transmission apparatus 1.

The transmission apparatus 1 includes a serial parallel transform processing unit 110, bit signal transform processing units 120-1, 120-2, . . . , 120-N, filter processing units 130-1, 130-2, . . . , 130-N, a precoding processing unit 140, clipping processing units 150-1, 150-2, . . . , 150-N, and transmission processing units 160-1, 160-2, . . . , 160-N. Note that the numerical value N of the bit signal transform processing unit 120-N, the filter processing unit 130-N, the clipping processing unit 150-N, and the transmission processing unit 160-N is a positive integer. FIG. 3 illustrates a functional configuration of the transmission apparatus 1 when N is a positive integer satisfying N≥3.

The serial parallel transform processing unit 110 performs, on a single bit sequence input to the serial parallel transform processing unit 110, transform of rearranging the single bit sequence into as many sequences as the number of the preconfigured numerical value N, and outputs the N bit sequences. The serial parallel transform processing unit 110 inputs the bit sequences to each of the bit signal transform processing units 120-1, 120-2, . . . , 120-N one by one. In the following description, it is assumed that the numerical value N is the same number (eight) as the number of antenna elements of the transmission antenna unit 2 and the reception antenna unit 3. However, the number of rearranged bit sequences need not be the same number of the number of antenna elements of the transmission antenna unit 2. Each of the N bit sequences output by the serial parallel transform processing unit 110 is an example of the transmission data set of the present example embodiment.

The bit signal transform processing units 120-1, 120-2, . . . , 120-N transform the input bit sequences into complex signals. In the following description, when the bit signal transform processing units 120-1, 120-2, . . . , 120-N need not be distinguished from each other, the bit signal transform processing units 120-1, 120-2, . . . , 120-N are referred to as the "bit signal transform processing unit 120". The bit signal transform processing unit 120 is implemented by a circuit that transforms the bit sequences into QAM signal points when using a coding circuit of an error correction code for coding the bit sequences and a quadrature amplitude modulation (QAM) scheme.

The bit signal transform processing unit 120-1 inputs the complex signal to the filter processing unit 130-1. The bit signal transform processing unit 120-2 inputs the complex signal to the filter processing unit 130-2. The bit signal transform processing unit 120-N inputs the complex signal to the filter processing unit 130-N.

The filter processing units 130-1, 130-2, . . . , 130-N perform waveform shaping filter processing of transforming the complex signals into transmission signals having a predetermined frequency band, and input the transmission signals to the precoding processing unit 140. In the following description, when the filter processing units 130-1, 130-2, . . . , 130-N need not be distinguished from each other, the filter processing units 130-1, 130-2, . . . , 130-N are referred to as the "filter processing unit 130". The filter processing unit 130 performs the waveform shaping filter processing using a root raised cosine (RRC) filter, for example.

The precoding processing unit 140 performs precoding processing of combining N signal sequences of which number is the same number as the number of data sets output by the serial parallel transform processing unit 110, and outputs N signals of which number is the same number as the number of antenna elements of the transmission antenna unit 2. The precoding processing unit 140 respectively inputs elements included in the signals after the precoding processing to the clipping processing units 150-1, 150-2, . . . , 150-N one by one.

Each of the clipping processing units 150-1, 150-2, . . . , 150-N includes an absolute value phase separation processing unit 151, a comparison processing unit 152, and an absolute value phase combining processing unit 153 (see FIG. 4). In the following description, when the clipping processing units 150-1, 150-2, . . . , 150-N need not be distinguished from each other, the clipping processing units 150-1, 150-2, . . . , 150-N are referred to as the "clipping processing unit 150". When an amplitude value of the signal input to the clipping processing unit 150 is larger than a preconfigured value, the clipping processing unit 150 performs clipping processing of removing an excessive portion of the amplitude, and outputs the transmission signals.

The absolute value phase separation processing unit 151 separates the transmission signals input to the clipping processing unit 150 into an absolute value component and a phase component. Then, the absolute value phase separation processing unit 151 inputs an absolute value S corresponding to the absolute value component separated from the transmission signals to the comparison processing unit 152, and inputs an argument θ corresponding to the phase component separated from the transmission signals into the absolute value phase combining processing unit 153.

The comparison processing unit 152 compares the absolute value S input from the absolute value phase separation processing unit 151 and a preconfigured numerical value A (A is a positive real number), and inputs one of the absolute value S and the numerical value A having the smaller numerical value to the absolute value phase combining processing unit 153 as an output value S'.

The absolute value phase combining processing unit 153 performs inverse transform from the absolute value phase separation processing unit 151, based on the argument θ input from the absolute value phase separation processing unit 151 and the output value S' of the comparison processing unit 152, and outputs a complex value having an absolute value of S' and having an argument of θ as the transmission signals.

The clipping processing unit 150-1 inputs the transmission signal to the transmission processing unit 160-1. The clipping processing unit 150-2 inputs the transmission signal to the transmission processing unit 160-2. The clipping processing unit 150-N inputs the transmission signal to the transmission processing unit 160-N.

The transmission processing units 160-1, 160-2, . . . , 160-N include a circuit that transforms baseband signals into high-frequency radio signals, a power amplifier (PA) that amplifies signal power, and the like, and input the transmission signals to the transmission antenna unit 2 as electromagnetic waves. The transmission processing unit 160-1 inputs the transmission signal to the antenna element 21 (see FIG. 1). The transmission processing unit 160-2 inputs the transmission signal to the antenna element 22 (see FIG. 1). The transmission processing unit 160-N inputs the transmission signal to the antenna element 28 (see FIG. 1), for example. In the following description, when the transmission processing units 160-1, 160-2, . . . , 160-N need not be distinguished from each other, the transmission processing units 160-1, 160-2, . . . , 160-N are referred to as the "transmission processing unit 160". The antenna elements 21, 22, . . . , 28 emit the electromagnetic waves to a space.

<2.4. Functional Configuration of Reception Apparatus>

Figure 5:
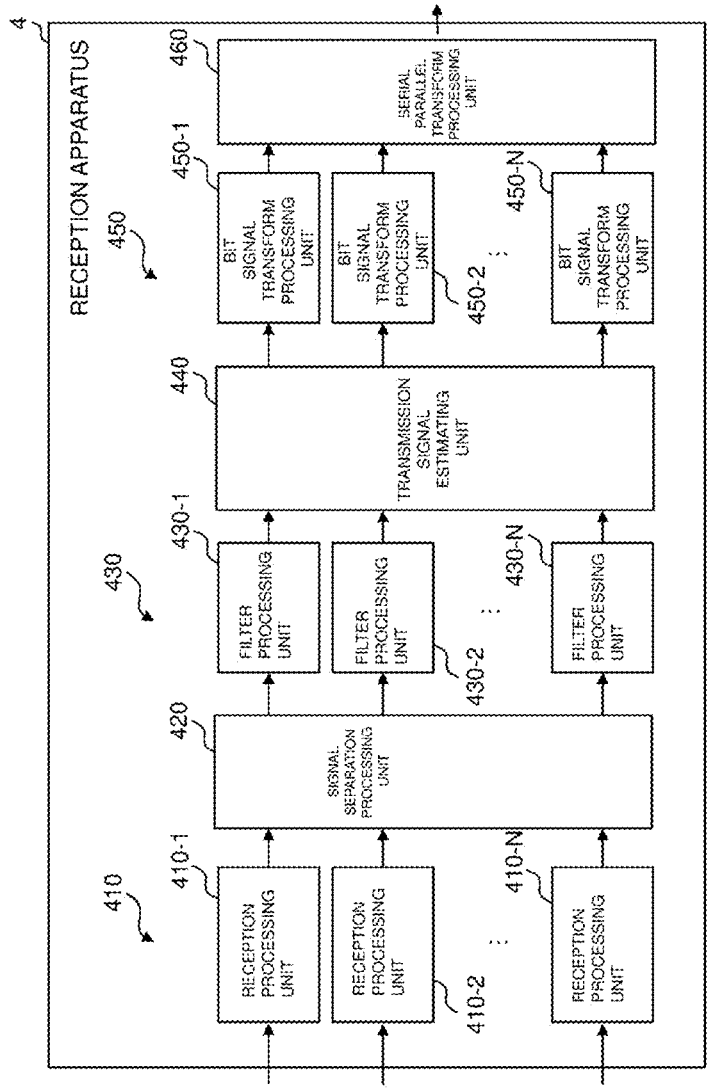
FIG. 5 is a functional block diagram illustrating a functional configuration of a reception apparatus according to the first example embodiment.
Figure 6:
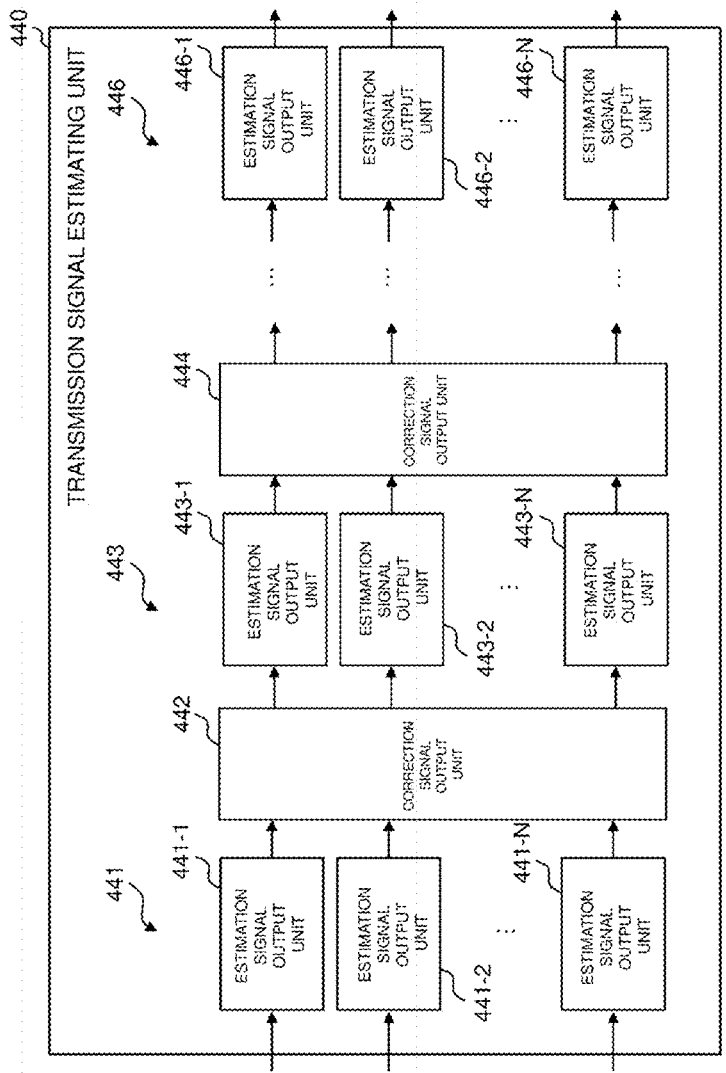
FIG. 6 is a functional block diagram illustrating a functional configuration of a transmission signal estimating unit according to the first example embodiment.
Figure 7:
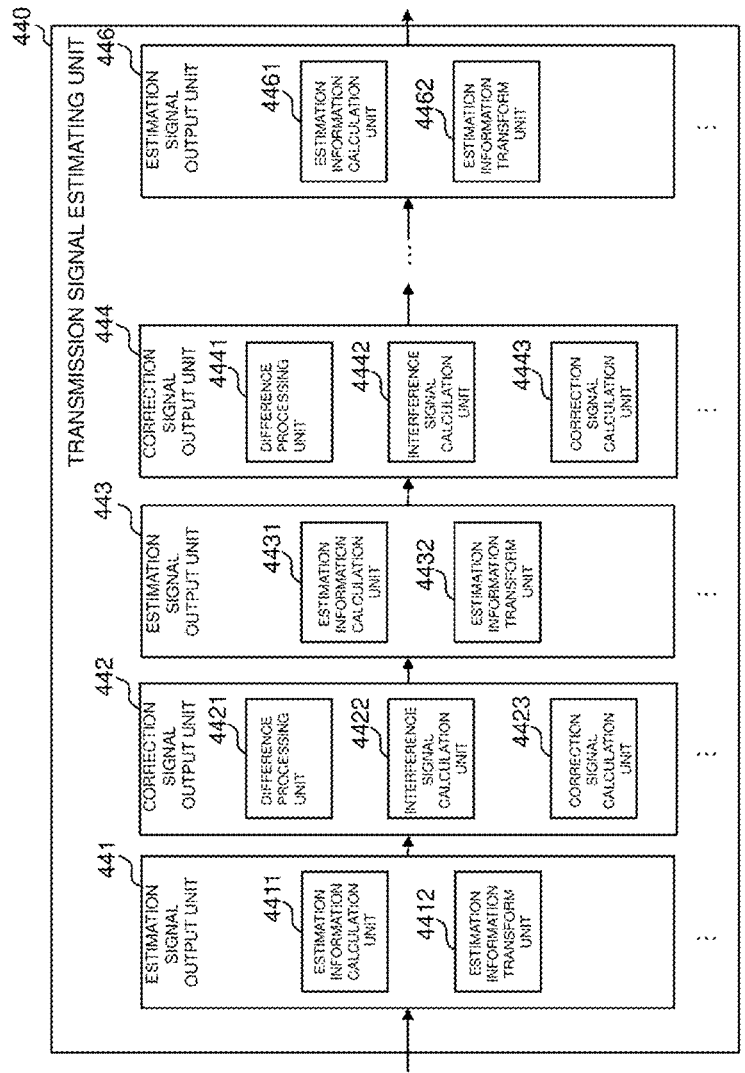
FIG. 7 is a functional block diagram illustrating a detailed functional configuration of the transmission signal estimating unit according to the first example embodiment.

Next, with reference to FIG. 5 to FIG. 7, a functional configuration of the reception apparatus 4 will be described. FIG. 5 is a functional block diagram illustrating a functional configuration of the reception apparatus 4 according to the first example embodiment. FIG. 6 is a functional block diagram illustrating a functional configuration of a transmission signal estimating unit 440 included in the reception apparatus 4. FIG. 7 is a functional block diagram illustrating a detailed functional configuration of the transmission signal estimating unit 440.

The reception apparatus 4 includes reception processing units 410-1, 410-2, . . . , 410-N, a signal separation processing unit 420, filter processing units 430-1, 430-2, . . . , 430-N, a transmission signal estimating unit 440, bit signal transform processing units 450-1, 450-2, . . . , 450-N, and a serial parallel transform processing unit 460. Note that the numerical value N of the reception processing unit 410-N, the filter processing unit 430-N, and the bit signal transform processing unit 450-N is a positive integer. FIG. 5 illustrates a functional configuration of the reception apparatus 4 when N is a positive integer satisfying N≥3.

To the reception processing unit 410-1, an electromagnetic wave received by the antenna element 31 is input. To the reception processing unit 410-2, an electromagnetic wave received by the antenna element 32 is input. To the reception processing unit 410-N, an electromagnetic wave received by the antenna element 38 is input. The reception processing units 410-1, 410-2, . . . , 410-N transform the received electromagnetic waves into reception signals. In the following description, when the reception processing units 410-1, 410-2, . . . , 410-N need not be distinguished from each other, the reception processing units 410-1, 410-2, . . . , 410-N are referred to as the "reception processing unit 410". Note that, in the reception apparatus 4 as well, it is assumed that the numerical value N is the same number (eight) as the number of antenna elements of the transmission antenna unit 2 and the reception antenna unit 3. However, the numerical value N need not be the same number as the antenna elements of the reception antenna unit 3.

The signal separation processing unit 420 performs processing corresponding to the inverse transform for the precoding processing performed by the precoding processing unit 140 on the signals received from the reception antenna unit 3, and thereby outputs as many (N) reception signals as the number of antenna elements of the reception antenna unit 3. The signal separation processing unit 420 inputs the reception signals to the filter processing units 430-1, 430-2, . . . , 430-N one by one. Each of the reception signals output by the signal separation processing unit 420 is an example of the reception data set of the present example embodiment. The signal separation processing unit 420 is an example of the signal separating unit of the present example embodiment.

The filter processing units 430-1, 430-2, . . . , 430-N are each a matched filter such as a root raised cosine filter, and perform filter processing of maximizing the signal-to-noise power ratio of the reception signals received from the signal separation processing unit 420. In the following description, when the filter processing units 430-1, 430-2, . . . , 430-N need not be distinguished from each other, the filter processing units 430-1, 430-2, . . . , 430-N are referred to as the "filter processing unit 430". The filter processing unit 430 inputs the reception signals on which the filter processing is performed to the transmission signal estimating unit 440.

The transmission signal estimating unit 440 removes, from the reception signals received from the filter processing unit 430, compensation of the distortion of the signals caused due to the clipping processing in the transmission apparatus 1 and interference of the signals caused when the signals are transmitted from the transmission apparatus 1 to the reception apparatus 4. The transmission signal estimating unit 440 inputs data sets corresponding to the reception signals after the signal distortion and the interference component are removed to the bit signal transform processing units 450-1, 450-2, . . . , 450-N one by one.

As illustrated in FIG. 5, the transmission signal estimating unit 440 includes estimation signal output units 441-1, 441-2, . . . , 441-N, estimation signal output units 443-1, 443-2, . . . , 443-N, and estimation signal output units 446-1, 446-2, . . . , 446-N. Note that the numerical value N of the estimation signal output unit 441-N, the estimation signal output unit 443-N, and the estimation signal output unit 446-N is a positive integer. FIG. 6 illustrates a configuration of the transmission signal estimating unit 440 when N is a positive integer satisfying N≥3. The transmission signal estimating unit 440 includes correction signal output units 442 and 444. In the following description, when the estimation signal output units 441-1, 441-2, . . . , 441-N need not be distinguished from each other, the estimation signal output units 441-1, 441-2, . . . , 441-N are referred to as the "estimation signal output unit 441". In the following description, when the estimation signal output units 443-1, 443-2, . . . , 443-N need not be distinguished from each other, the estimation signal output units 443-1, 443-2, . . . , 443-N are referred to as the "estimation signal output unit 443". In the following description, when the estimation signal output units 446-1, 446-2, . . . , 446-N need not be distinguished from each other, the estimation signal output units 446-1, 446-2, . . . , 446-N are referred to as the "estimation signal output unit 446".

The estimation signal output unit 441 includes an estimation information calculation unit 4411 and an estimation information transform unit 4412, and outputs an estimation value of the transmission signals. The estimation signal output unit 443 includes an estimation information calculation unit 4431 and an estimation information transform unit 4432, and outputs an estimation value of the transmission signals. The estimation signal output unit 446 includes an estimation information calculation unit 4461 and an estimation information transform unit 4462, and outputs an estimation value of the transmission signals. The correction signal output unit 442 includes a difference processing unit 4421, an interference signal calculation unit 4422, and a correction signal calculation unit 4423, and outputs a correction signal for correcting the reception signals. The correction signal output unit 444 includes a difference processing unit 4441, an interference signal calculation unit 4442, and a correction signal calculation unit 4443, and outputs a correction signal for correcting the reception signals. The details of elements included in the transmission signal estimating unit 440 will be described later.

The bit signal transform processing units 450-1, 450-2, . . . , 450-N perform inverse transform for the processing performed by the bit signal transform processing unit 120, and thereby transform the reception signals into N reception bit sequences. In the following description, when the bit signal transform processing units 450-1, 450-2, ..., 450-N need not be distinguished from each other, the bit signal transform processing units 450-1, 450-2, ..., 450-N are referred to as the "bit signal transform processing unit 450". The bit signal transform processing unit 450 is implemented by a circuit that transforms the reception signals from the QAM signal points to bit sequences when using a decoding circuit of an error correction code for decoding the reception signals and a QAM scheme. The bit sequences output by the bit signal transform processing units 450-1, 450-2, ..., 450-N are input to the serial parallel transform processing unit 460.

The serial parallel transform processing unit 460 rearranges and transforms the N bit sequences into a single bit sequence, and outputs the single bit sequence. In other words, the serial parallel transform processing unit 460 performs inverse transform from the serial parallel transform processing unit 110 on the input data sets.

In the transmission and reception system 1000 of the present example embodiment, transmission and reception of signals are performed by the elements as described in the above.

<2.5. Flow of Processing in Transmission Apparatus>

Figure 8:
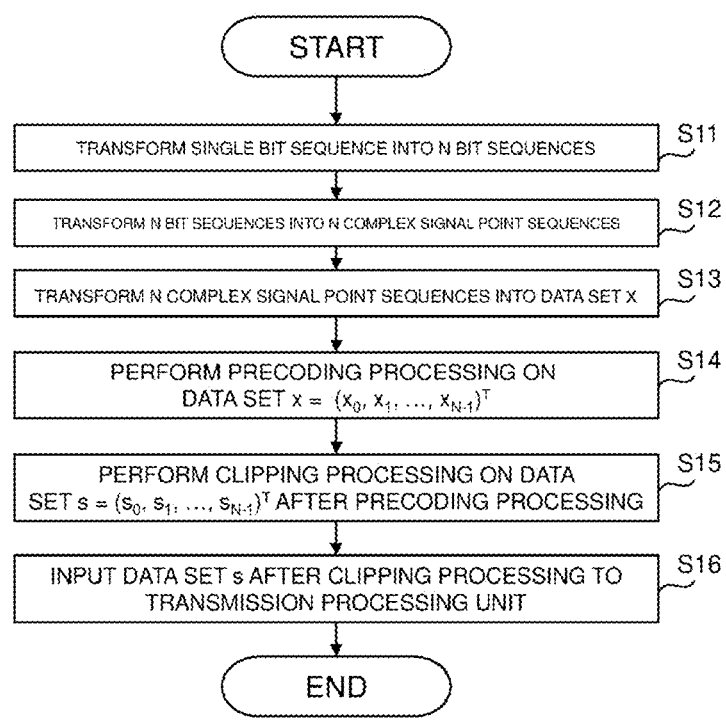
FIG. 8 is a flowchart illustrating a flow of processing in the transmission apparatus according to the first example embodiment.

Next, a flow of processing in the transmission apparatus 1 will be described with reference to FIG. 8. FIG. 8 is a flowchart illustrating a flow of processing in the transmission apparatus 1. Note that, in the present example embodiment, when a letter with a hat is described, "(hat)" is attached after the letter. In the present example embodiment, when a letter with a tilde is described, "(tilde)" is attached after the letter.

Information consisting of the single bit sequence input to the transmission apparatus 1 is input to the serial parallel transform processing unit 110. In Step S11, the serial parallel transform processing unit 110 rearranges the single bit sequence into N bit sequences. The serial parallel transform processing unit 110 inputs bit sequences included in the N bit sequences to the bit signal transform processing units 120-1, 120-2, ..., 120-N one by one.

In Step S12, the bit signal transform processing unit 120 performs error correction coding processing and transform processing on the QAM signal points on the bit sequences received from the serial parallel transform processing unit 110, and thereby transforms the bit sequences into complex signals. The bit signal transform processing unit 120 inputs the complex signals to the filter processing unit 130.

In Step S13, the filter processing unit 130 transforms the complex signals received from the bit signal transform processing unit 120 into the following data set having a predetermined frequency band.

$$x=(x_0, x_1, \ldots, x_{N-1})^T \quad \text{[Math. 1]}$$

The filter processing unit 130 inputs a data set x being a vector to the precoding processing unit 140.

In Step S14, the precoding processing unit 140 performs arithmetic operation shown in (Equation 1) on the data set x being a vector,

[Math. 2]

$$s = F_N x \quad \text{(Equation 1)}$$

and obtains the following data set.

$$s=(s_0, s_1, \ldots, s_{N-1})^T \quad \text{[Math. 3]}$$

Note that, in (Equation 1), $$F_N \quad \text{[Math. 4]}$$

is an inverse discrete Fourier transform matrix having a size of N×N, and its (i,j) component $f_{i,j}$ is given according to (Equation 2) (i, j is an integer from 0 to N−1).

[Math. 5]

$$f_{i,j} = \frac{1}{\sqrt{N}} \exp\left(\sqrt{-1}\frac{2\pi ij}{N}\right) \quad \text{(Equation 2)}$$

The precoding processing unit 140 inputs elements ($S_0$, $S_1$, ..., $S_{N-1}$) of the following data set being a vector to the clipping processing units 150-1, 150-2, ..., 150-N one by one.

$$s=(s_0, s_1, \ldots, s_{N-1})^T \quad \text{[Math. 6]}$$

In Step S15, the clipping processing unit 150 performs clipping processing on the elements of the data set s being a vector received from the precoding processing unit 140. In the following description, the elements of the data set s being a vector received from the precoding processing unit 140 are simply referred to as "elements s".

The clipping processing performed by the clipping processing unit 150 on the elements s received from the precoding processing unit 140 will be described. The elements s received from the precoding processing unit 140 are first input to the absolute value phase separation processing unit 151 in the clipping processing unit 150.

The absolute value phase separation processing unit 151 separates the elements s into an absolute value component and a phase component. Let S represent an absolute value and θ an argument when the elements s are expressed by a complex number, the elements can be expressed as follows.

$$s = S \cdot \exp(\sqrt{-1}\theta) \quad \text{[Math. 7]}$$

Regarding the elements s, the absolute value phase separation processing unit 151 inputs the absolute value S to the comparison processing unit 152, and inputs the argument θ to the absolute value phase combining processing unit 153.

Subsequently, the comparison processing unit 152 compares the values between absolute value S received from the absolute value phase separation processing unit 151 and the numerical value A (A is a positive real numerical value) corresponding to the predetermined threshold. Then, the comparison processing unit 152 outputs the smaller one of the absolute value S and the numerical value A to the absolute value phase combining processing unit 153 as the output value S'. Note that, when absolute value S=numerical value A, the comparison processing unit 152 outputs to the absolute value phase combining processing unit 153 as numerical value A=output value S'.

In other words, regarding the absolute value S received from the absolute value phase separation processing unit 151, the comparison processing unit 152 outputs the output value S' as follows.

$$IF\ S \geq A, S' = A$$

$$IF\ S < A, S' = S \quad \text{[Math. 8]}$$

The absolute value phase combining processing unit 153 performs inverse transform from the absolute value phase separation processing unit 151 based on the argument θ received from the absolute value phase separation processing unit 151 and the output value S' received from the comparison processing unit 152, and outputs the following complex value having an absolute value of S' and an argument of θ.

$$\gamma_A(s) = S' \cdot \exp(\sqrt{-1}\theta) \quad \text{[Math. 9]}$$

In other words, when the absolute value S of the elements s received from the precoding processing unit 140 is equal to or larger than the predetermined threshold (numerical value A), the clipping processing unit 150 outputs by replacing only the absolute value to the numerical value A and without changing phase. In contrast, when the absolute value of the elements s received from the precoding processing unit 140 is smaller than the predetermined threshold (numerical value A), the clipping processing unit 150 outputs without replacing the absolute value S of the elements s to the numerical value A. In this manner, in the transmission apparatus 1, the transmission signals can be output after removing amplitude equal to or larger than the predetermined threshold (for example, the numerical value A). The clipping processing unit 150 inputs the elements ($S_0$, $S_1$, ..., $S_{N-1}$) on which the clipping processing is performed to the transmission processing units 160-1, 160-2, ..., 160-N one by one.

In Step S16, the transmission processing unit 160 performs transform processing of transforming baseband signals into radio signals and amplification processing using the power amplifier on the elements s received from the clipping processing unit 150, and inputs the elements s to the transmission antenna unit 2 as the transmission signals. Each of the antenna elements 21, 22, ..., 28 of the transmission antenna unit 2 emits the transmission signals received from the transmission processing unit 160 to a space as electromagnetic waves.

<2.6. Flow of Processing in Reception Apparatus>

Figure 9:
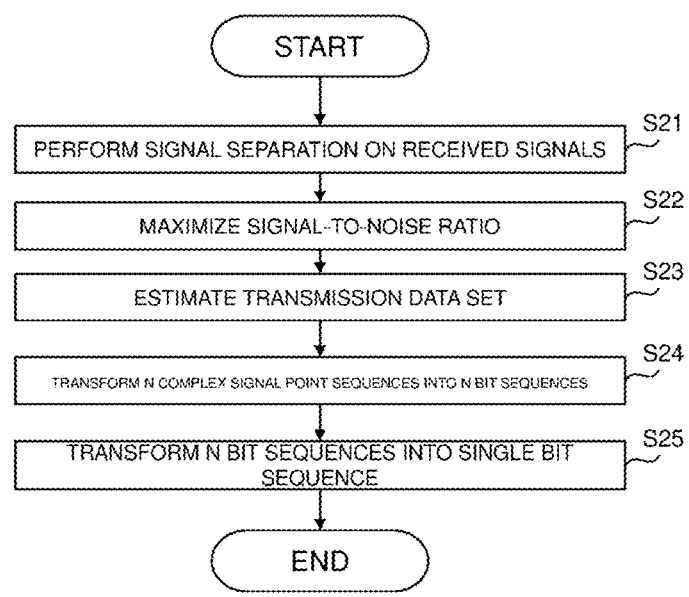
FIG. 9 is a flowchart illustrating a flow of processing in the reception apparatus according to the first example embodiment.

Next, a flow of processing in the reception apparatus 4 will be described with reference to FIG. 9. FIG. 9 is a flowchart illustrating a flow of processing in the reception apparatus 4.

The antenna elements 31, 32, ..., 38 receive the signals emitted from the transmission antenna unit 2, in other words, the transmission signals of the transmission apparatus 1, and input the signals to the reception apparatus 4. The signal received by the antenna element 31 is input to the reception processing unit 410-1, for example. The signal received by the antenna element 32 is input to the reception processing unit 410-2, for example. The signal received by the antenna element 38 is input to the reception processing unit 410-N, for example.

The reception processing unit 410 transforms the signals received from the reception antenna unit 3 from radio signals into baseband signals, and inputs the baseband signals to the signal separation processing unit 420. Here, the baseband signals input to the signal separation processing unit 420 by the reception processing unit 410 are referred to as a data set expressed as follows.

$$s = (s_0, s_1, \ldots, s_{N-1})^T \quad \text{[Math. 10]}$$

In Step S21, the signal separation processing unit 420 performs inverse transform from the precoding processing, and thereby separates the signals combined in the transmission apparatus 1 from the data set s being a vector. Specifically, the signal separation processing unit 420 performs arithmetic operation on the data set s being a vector as expressed in (Equation 3),

[Math. 11]

$$x' = F_N^\dagger s \quad \text{(Equation 3)}$$

and outputs the following data set being a vector.

$$x' = (x'_0, x'_1, \ldots, x'_{N-1})^T \quad \text{[Math. 12]}$$

The data set x' being a vector output by the signal separation processing unit 420 is an example of the reception data set of the present example embodiment. Here, in (Equation 3), the following matrix $$F_N^\dagger \quad \text{[Math. 13]}$$

is a discrete Fourier transform matrix having a size of N×N, and is a conjugate transpose matrix of the following N×N matrix in (Equation 1).

$$F_N \quad \text{[Math. 14]}$$

The following (i,j) component (Math. 16) of the following matrix (Math. 15)

$$F_N^\dagger \quad \text{[Math. 15]}$$

$$f_{i,j}^* \quad \text{[Math. 16]}$$

is given according to (Equation 4) (i, j is an integer from 0 to N−1).

[Math. 17]

$$f_{i,j}^* = \frac{1}{\sqrt{N}} \exp\left(-\sqrt{-1}\frac{2\pi ij}{N}\right) \quad \text{(Equation 4)}$$

Elements $x_0, x_1, \ldots, x_{N-1}$ of the signals output by the signal separation processing unit 420 are respectively input to the filter processing units 430-1, 430-2, ..., 430-N. In the following description, the elements of the data set x' being a vector received from the signal separation processing unit 420 are simply referred to as "elements x'".

In Step S22, the filter processing unit 430 performs filter processing of maximizing the signal-to-noise power ratio on the elements x received from the signal separation processing unit 420. The filter processing unit 430 inputs a data set y corresponding to the elements x' after the filter processing to the transmission signal estimating unit 440.

<2.7. Flow of Processing of Estimating Transmission Data Set>

Figure 10:
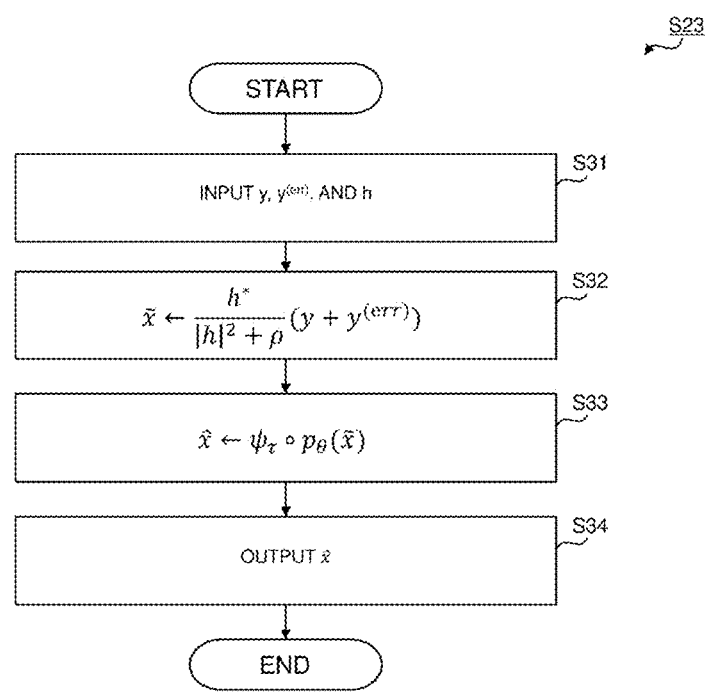
FIG. 10 is a flowchart illustrating a flow of processing of calculating an estimation value of a transmission data set according to the first example embodiment.
Figure 11:
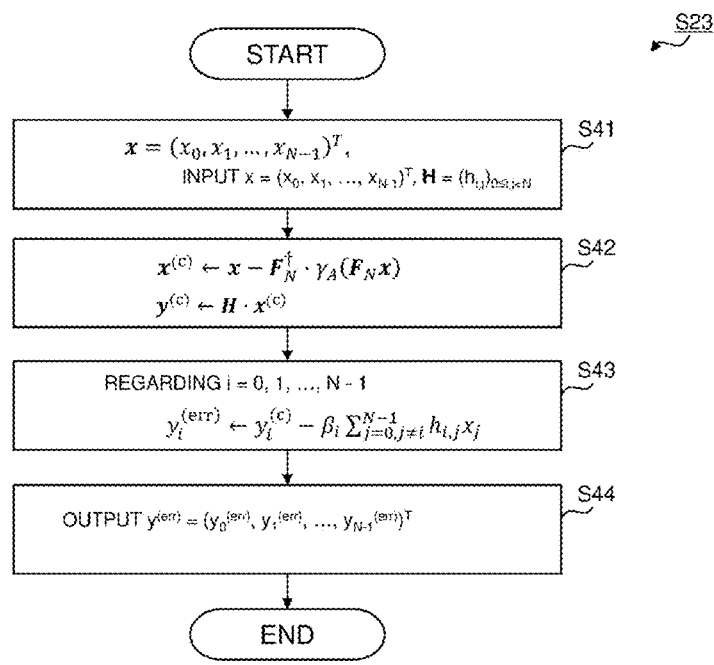
FIG. 11 is a flowchart illustrating a flow of processing of calculating a correction value of a reception data set according to the first example embodiment.

In Step S23, the transmission signal estimating unit 440 estimates the transmission data set. Here, with reference to FIG. 10 and FIG. 11, a flow of processing of estimating the transmission data set will be described. FIG. 10 is a flowchart illustrating a flow of processing of calculating an estimation value of the transmission data set. FIG. 11 is a flowchart illustrating a flow of processing of calculating a correction value of the reception data set. Note that the flowcharts illustrated in FIG. 10 and FIG. 11 correspond to the process performed in Step S23 of FIG. 9.

In Step S31, to the estimation signal output unit 441, the data set y received from the filter processing unit 430, a correction signal $y^{(err)}$, and a channel gain h are input. Note that the channel gain h corresponds to gain information related to a channel between the transmission apparatus 1 and the reception apparatus 4, and may be information stored in the reception apparatus 4 in advance. In the estimation signal output unit 441, it is assumed that the correction signal $y^{(err)}$ is 0. The estimation signal output unit 441 is an example of the first estimation signal output unit of the present example embodiment.

In Step S32, the estimation information calculation unit 4411 calculates an estimation data set x (tilde), based on the data set y received from the filter processing unit 430, the correction signal $y^{(err)}$, and the channel gain h (Equation 5). The estimation information calculation unit 4411 is an example of the first estimation information calculation unit of the present example embodiment. The estimation data set x (tilde) calculated by the estimation information calculation unit 4411 is an example of the first estimation information of the present example embodiment.

[Math. 18]

$$\tilde{x} = \frac{h^*}{|h|^2 + \rho}(y + y^{(err)})$$ (Equation 5)

In (Equation 5), $$h^*$$ [Math. 19]

represents the complex conjugate of the channel gain h. In (Equation 5), $$|h|$$ [Math. 20]

represents the absolute value of the channel gain h. In (Equation 5), p is a parameter that can be freely configured within the range of positive real numbers, and is a value determined based on a value that is considered as being optimal through learning using backpropagation. ρ being a parameter that can be freely configured within the range of positive real numbers is an example of the first parameter of the present example embodiment.

In Step S33, the estimation information transform unit 4412 transforms the estimation data set x (tilde) by using the following composite function of a non-linear function $\psi_\tau$ with parameters and a non-linear function $p_\theta$ with parameters, $$\psi_\tau \circ p_\theta$$ [Math. 21]

and obtains the following data set.

$$\hat{x} = \psi_\tau \circ p_\theta(\tilde{x})$$ [Math. 22]

An example of the non-linear function $\psi_\tau$ with parameters is shown in (Equation 6).

[Math. 23]

$$\psi_\tau(x) = \sum_{q \in Q}\left(-1 + \frac{ReLU(x - q + \tau_q)}{\tau_q} - \frac{ReLU(x + q - \tau_q)}{\tau_q}\right)$$ (Equation 6)

More accurately, the non-linear function $\psi_\tau$ with parameters is configured as a function obtained by applying the function of (Equation 6) to the real part and the imaginary part of the elements x expressed as a complex number.

Note that, in (Equation 6), Q is a set of signal points determined depending on the modulation scheme configured in the bit signal transform processing unit 120, and for example, when the modulation scheme of the bit signal transform processing unit 120 is 16QAM, Q can be determined as Q={−3, −1, +1, +3}. ReLU(x) is a function that is often used in a deep neural network, which compares x and 0 and outputs the larger one.

$\tau_q$ (q is an element of the signal point set Q) of (Equation 6) is a parameter that can be freely configured as a real numerical value other than 0, and is a value determined based on a value that is considered as being optimal through learning using backpropagation. $\tau_q$ being a parameter that can be freely configured as a real numerical value other than 0 is an example of the second parameter of the present example embodiment.

Next, a specific example of the non-linear function $p_\theta$ with parameters is shown in (Equation 7).

[Math. 24]

$$p_\theta(x) = \theta_0 + \theta_1 x + \theta_2 x^2 + \ldots + \theta_m x^m$$ (Equation 7)

Similarly to the case of the non-linear function $\psi_\tau$ with parameters, the function of (Equation 7) above is applied to the real part and the imaginary part of the elements x expressed as a complex number. $p_\theta(x)$ of (Equation 7) is a polynomial with a degree of m (m is a positive integer), and the coefficients, as described in the following expression, of respective terms are parameters that can be freely configured.

$$\theta_0, \theta_1, \ldots, \theta_m$$ [Math. 25]

Similarly to the parameter $\tau_q$ in (Equation 6), the parameters $\theta_0, \theta_1, \ldots, \theta_m$ are each a value determined based on a value that is considered as being optimal through learning using backpropagation. The parameters $\theta_0, \theta_1, \ldots, \theta_m$ are an example of the third parameter of the present example embodiment.

In Step S34, the estimation signal output unit 441 outputs the data set x (hat) as an estimation value of the transmission signals. The estimation data set x (hat) output by the estimation signal output unit 441 is an example of the first estimation value of the present example embodiment. The estimation information transform unit 4412 is an example of the first estimation information transform unit of the present example embodiment.

In this manner, the estimation signal output unit 441 corrects the estimation data set x (tilde) calculated according to (Equation 5) by using the non-linear function $\psi_\tau$ with learning parameters and the non-linear function $p_\theta$, and then outputs the data set x (hat).

The data set x (hat) output from the estimation signal output units 441-1, 441-2, . . . , 441-N is input to the correction signal output unit 442 as the following data set, when expressed as a vector.

$$\hat{x} = (\hat{x}_0, \hat{x}_1, \ldots, \hat{x}_{N-1})^T$$ [Math. 26]

Next, a flow of processing in the correction signal output unit 442 will be described with reference to FIG. 11. In Step S41, to the correction signal output unit 442, the data set x (hat) being a vector and $N^2$ channel gains $h_{i,j}$ (i, j are each an integer from 0 to N−1) are input. Note that each of the following N pieces of information with i=j out of the $N^2$ channel gains $h_{i,j}$ matches the channel gains h respectively used in the estimation signal output units 441-1, 441-2, . . . , 441-N.

$$h_{0,0}, h_{1,1}, \ldots, h_{N-1,N-1}$$ [Math. 27]

In Step S42, the difference processing unit 4421 performs arithmetic operation of (Equation 8),

[Math. 28]

$$x^{(c)} = x - F_N^\dagger \cdot \gamma_A(F_N x)$$ (Equation 8)

and calculates a difference data set as described in the following expression between the data obtained by performing the precoding processing and the clipping processing in the transmission apparatus 1 on the data set x (hat) being a vector and the data set x (hat) being a vector.

$$x^{(c)} = (x_0^{(c)}, x_1^{(c)}, \ldots, x_{N-1}^{(c)})$$ [Math. 29]

The difference data set $x^{(c)}$ being a vector calculated by the difference processing unit 4421 is an example of the first difference data set of the present example embodiment. The difference processing unit 4421 is an example of the first difference processing unit of the present example embodiment.

Note that, in (Equation 8), the following matrix corresponds to the discrete Fourier transform matrix of (Equation 1).

$$F_N \qquad \text{[Math. 30]}$$

In (Equation 8), $$F_N^\dagger \qquad \text{[Math. 31]}$$

is an inverse discrete Fourier transform matrix of the discrete Fourier transform matrix of (Equation 1), and corresponds to the processing of separating a signal component combined in the precoding processing. $\gamma_A(s)$ represents a function of applying the clipping processing (see FIG. 4) having a threshold of the numerical value A for each element of the vector s. The following data set $$F_N^\dagger \cdot \gamma_A(F_N x) \qquad \text{[Math. 32]}$$

is an example of the element obtained by separating the signal component combined for the data set x (hat) being a vector in the precoding processing, and corresponds to the element including the signal distortion component and the noise component due to the clipping processing in the transmission apparatus 1.

In Step S42, the interference signal calculation unit 4422 performs the following arithmetic operation (Math. 34), based on the difference signal $x^{(c)}$ calculated according to (Equation 8) and the following N×N matrix (Math. 33) having the (i,j) component of $N^2$ channel gains $h_{i,j}$, $$H \qquad \text{[Math. 33]}$$

[Math. 34]

$$\gamma^{(c)} = H \cdot x^{(c)} \qquad \text{(Equation 9)}$$

and calculates an interference signal (Math. 35) corresponding to the interference component between the signals transmitted from the transmission apparatus 1 to the reception apparatus 4.

$$\gamma^{(c)} = (\gamma_0^{(c)}, \gamma_1^{(c)}, \ldots, \gamma_{N-1}^{(c)}) \qquad \text{[Math. 35]}$$

The interference signal $y^{(c)}$ being a vector calculated by the interference signal calculation unit 4422 is an example of the first interference signal of the present example embodiment. The interference signal calculation unit 4422 is an example of the first interference signal calculation unit of the present example embodiment.

Next, in Step S43, the correction signal calculation unit 4423 performs the following arithmetic operation,

[Math. 36]

$$y_i^{(err)} = y_i^{(c)} - \beta_i \sum_{j=0, j \neq i}^{N-1} h_{i,j} x_j \qquad \text{(Equation 10)}$$

and calculates the following correction signal.

$$\gamma(err) = (\gamma_0^{(err)}, \gamma_1^{(err)}, \ldots, \gamma_{N-1}^{(err)})^T \qquad \text{[Math. 37]}$$

The correction signal $y^{(err)}$ being a vector calculated by the correction signal calculation unit 4423 is an example of the first correction signal of the present example embodiment.

The correction signal calculation unit 4423 is an example of the first correction signal calculation unit of the present example embodiment.

In (Equation 10), $$\beta_0, \beta_1, \ldots, \beta_{N-1} \qquad \text{[Math. 38]}$$

is a parameter that can be freely configured, and is configured to an optimal value through learning using backpropagation. The correction signal calculation unit 4423 outputs the correction signal $y^{(err)}$ being a vector obtained according to (Equation 10).

Note that, as described above, the correction signal $y^{(err)}$ used by the estimation signal output unit 441 is as follows.

$$y^{(err)} = (0,0, \ldots, 0) \qquad \text{[Math. 39]}$$

In other words, the estimation signal output unit 441 can obtain the estimation data set x (hat) by calculating the estimation data set x (tilde), based on the data set y received from the filter processing unit 430 and the channel gain h and transforming the estimation data set x (tilde).

The estimation signal output unit 443 performs the series of processing illustrated in the flowchart of FIG. 10, based on the correction signal $y^{(err)}$ output by the correction signal output unit 442, the data set y being an output signal of the filter processing unit 430, and the channel gain h. Then, the estimation signal output unit 443 outputs the estimation data set x (hat) to the correction signal output unit 444.

In other words, the estimation signal output unit 443 outputs the estimation data set x (hat), based on a signal (first added signal) obtained by adding the correction signal $y^{(err)}$ output by the correction signal output unit 442 to the output signal y of the filter processing unit 430 according to (Equation 5) and the channel gain h. The estimation signal output unit 443 is an example of the second estimation signal output unit of the present example embodiment, and the estimation data set x (hat) output from the estimation signal output unit 443 is an example of the second estimation value of the present example embodiment. The estimation information calculation unit 4431 is an example of the second estimation information calculation unit of the present example embodiment. Further, the estimation data set x (tilde) calculated by the estimation information calculation unit 4431 is an example of the second estimation information of the present example embodiment. Further, the estimation information transform unit 4432 is an example of the second estimation information transform unit of the present example embodiment.

The correction signal output unit 444 performs the series of processing illustrated in the flowchart of FIG. 11, based on the estimation data set x (hat) received from the estimation signal output unit 443 and the $N^2$ channel gains $h_{i,j}$ (i, j are each an integer from 0 to N−1). Then, the correction signal output unit 444 outputs the correction signal $y^{(err)}$. The correction signal output unit 444 is an example of the second correction signal output unit of the present example embodiment, and the correction signal $y^{(err)}$ output by the correction signal output unit 444 is an example of the second correction signal of the present example embodiment.

The difference processing unit 4441 included in the correction signal output unit 444 is an example of the second difference processing unit of the present example embodiment, and the difference data set $x^{(c)}$ being a vector calculated by the difference processing unit 4441 is an example of the second difference data set of the present example embodiment. Further, the interference signal calculation unit 4442 is an example of the second interference signal calculation unit of the present example embodiment, and the interference signal $y^{(c)}$ being a vector calculated by the interference signal calculation unit 4442 is an example of the second interference signal of the present example embodiment. Further, the correction signal calculation unit 4443 is an example of the second correction signal calculation unit of the present example embodiment.

Note that, in the transmission signal estimating unit 440, to the k-th estimation signal output unit (for example, the estimation signal output unit 446), k being a positive integer of two or greater, the correction signal $y^{(err)}$ output by the (k−1)-th correction signal output unit (for example, the correction signal output unit 444) is input. The k-th estimation signal output unit (for example, the estimation signal output unit 446) performs the series of processing illustrated in the flowchart of FIG. 10, based on the correction signal $y^{(err)}$ output by the (k−1)-th correction signal output unit (for example, the correction signal output unit 444), the output signal y of the filter processing unit 430, and the channel gain h. Then, the k-th estimation signal output unit (for example, the estimation signal output unit 446) outputs the estimation data set x (hat).

In other words, the estimation signal output unit 446 outputs the estimation data set x (hat), based on a signal (second added signal) obtained by adding the correction signal $y^{(err)}$ output by the correction signal output unit 444 to the output signal y of the filter processing unit 430 according to (Equation 5) and the channel gain h. The estimation signal output unit 446 is an example of the third estimation signal output unit of the present example embodiment, and the estimation data set x (hat) output from the estimation signal output unit 446 is an example of the third estimation value of the present example embodiment. The estimation information calculation unit 4461 is an example of the third estimation information calculation unit of the present example embodiment. Further, the estimation data set x (tilde) calculated by the estimation information calculation unit 4461 is an example of the third estimation information of the present example embodiment. Further, the estimation information transform unit 4462 is an example of the third estimation information transform unit of the present example embodiment.

The description proceeds with reference to FIG. 9 again, based on the assumption that the estimation data set x (hat) of the k-th estimation signal output unit (for example, the estimation signal output unit 446) is output from the transmission signal estimating unit 440 in the present example embodiment.

In Step S24, the bit signal transform processing unit 450 performs inverse transform for the processing performed by the bit signal transform processing unit 120, and thereby transforms the estimation data set x (hat) received from the transmission signal estimating unit 440 into N reception bit sequences.

In Step S25, the serial parallel transform processing unit 460 rearranges and transforms the N bit sequences into a single bit sequence, and outputs the single bit sequence.

As described in the above, in the transmission and reception system 1000 of the present example embodiment, the precoding processing and the clipping processing are performed on the signals to be transmitted when the signals are transmitted from the transmission apparatus 1 to the reception apparatus 4. In the reception apparatus 4, even if there is no information related to the processing performed on the signals to be transmitted in the transmission apparatus 1, the signals transmitted from the transmission apparatus 1 can be estimated, and thus redundant information need not be transmitted when the signals are transmitted from the transmission apparatus.

<2.8. Peak Power Reduction Effect>

Figure 12:
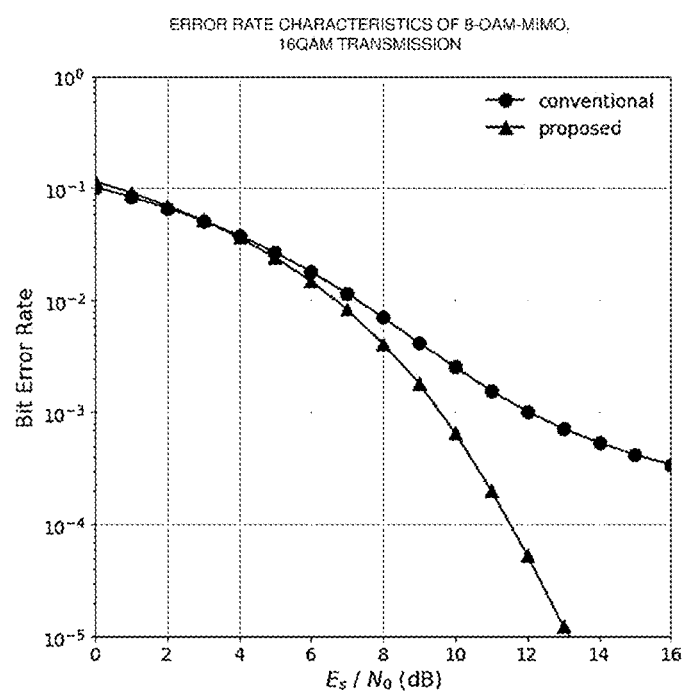
FIG. 12 is a diagram illustrating results of comparison between a transmission bit sequence input to the transmission apparatus and a reception bit sequence output by the reception apparatus according to the first example embodiment.

Next, a peak power reduction effect in the transmission and reception system 1000 of the present example embodiment will be described using a specific example. FIG. 12 is a diagram illustrating results of comparison between a transmission bit sequence input to the transmission apparatus 1 and a reception bit sequence output by the reception apparatus 4 in the transmission and reception system 1000. FIG. 12 illustrates a diagram illustrating, by using a graph, a bit error rate (BER) calculated through comparison between the transmission bit sequence input to the transmission apparatus 1 and the reception bit sequence output by the reception apparatus 4.

Provided that the modulation method in the bit signal transform processing unit 120 of the transmission apparatus 1 is 16QAM and the waveform shaping filter in the filter processing unit 130 is an RRC filter having a roll off coefficient of 0.1, the ratio between the transmission signals output by the transmission apparatus 1 and average signal power is maximum of 10 dB or higher. With the clipping processing unit 150, if the maximum amplitude value A is set to 1.6 times as large as the effective value, the PAPR can be reduced to approximately 4 dB (≈20×log 101.6). At the same time, however, approximately 10% of the transmission signals receive influence of distortion due to the clipping processing.

FIG. 12 illustrates the BER related to the reception signals after the processing of the estimation signal output unit 441, the correction signal output unit 442, the estimation signal output unit 443, the correction signal output unit 444, and the estimation signal output unit 446 is performed on the transmission signals received by the reception apparatus 4. Note that each of the parameter ρ, the parameter $\tau_q$, and the parameters $\theta_0, \theta_1, \ldots, \theta_m$ is a parameter obtained as a result of learning through backpropagation with the use of random sample data on the assumption that the batch size is 8192 symbols and the number of epochs is 10000.

The horizontal axis of the graph of FIG. 12 represents the signal-to-noise power ratio (Signal-to-Noise Ratio, SNR) related to an additive Gaussian noise channel, and the vertical axis thereof represents the BER. In FIG. 12, BER characteristics in the reception apparatus 4 according to the present example embodiment are shown in markers of black triangles, and BER characteristics in a reception apparatus of related art given as a reference example not including an element corresponding the transmission signal estimating unit 440 are shown in markers of black circles.

As illustrated in FIG. 12, the reception apparatus of the reference example receives influence that the signal component of 1.6 or more times as large as the effective value is limited due to the clipping processing in the transmission apparatus, and thus has a small reduction amount of the BER with respect to increase of the SNR. In contrast, it can be observed that the reception apparatus 4 of the present example embodiment achieves reduction of the BER with respect to increase of the SNR, and receives less influence of the clipping processing in the transmission apparatus 1 in comparison to the reference example.

As illustrated in FIG. 12, in the transmission and reception system 1000 of the present example embodiment, even when the signals are transmitted after performing the clipping processing, the PAPR of the transmission signals can be reduced without causing significant deterioration of communication quality. As described above, in the reception apparatus 4, even if there is no information related to the processing performed on the signals to be transmitted in the transmission apparatus 1, the signals transmitted from the transmission apparatus 1 can be estimated, and thus redundant information need not be transmitted when the signals are transmitted from the transmission apparatus. Therefore, in the present example embodiment, in the transmission and reception system of MIMO transmission or the like, both of reduction of peak power and reduction of a transmission rate can be achieved.

3. SECOND EXAMPLE EMBODIMENT

Next, a second example embodiment of the present disclosure will be described with reference to FIG. 13 and FIG. 14. While the first example embodiment described above is a specific example embodiment, the second example embodiment is a more generalized example embodiment. According to the second example embodiment described below, technical effects similar to those of the first example embodiment are exerted.

Figure 13:
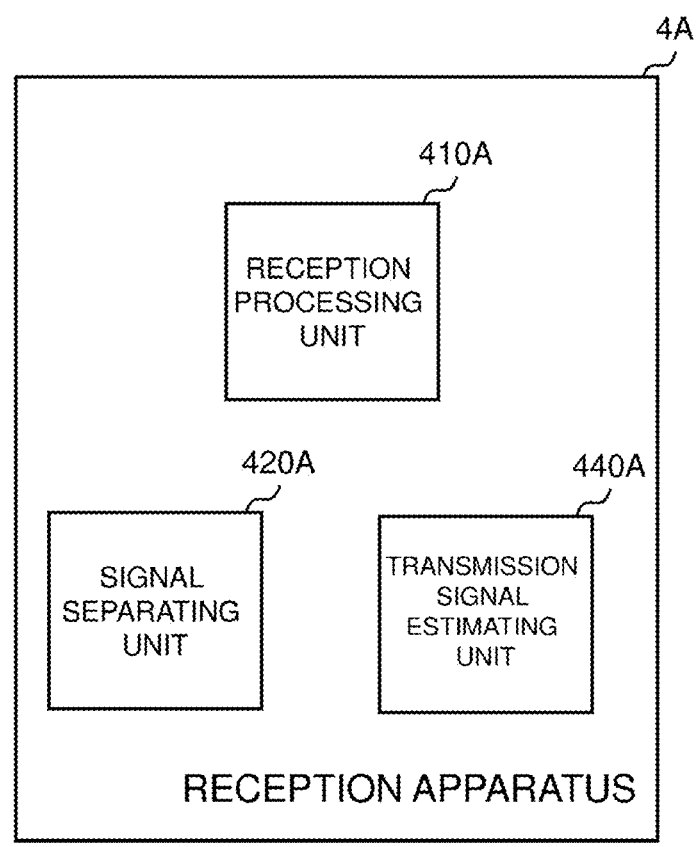
FIG. 13 is a block diagram illustrating an example of a schematic configuration of a reception apparatus according to a second example embodiment.

FIG. 13 is a block diagram illustrating an example of a schematic configuration of a reception apparatus 4A according to the second example embodiment of the present disclosure. The reception apparatus 4A includes a reception processing unit 410A, a signal separating unit 420A, and a transmission signal estimating unit 440A.

The reception processing unit 410A performs clipping processing of removing amplitude equal to or larger than a threshold on transmission signals that are generated by performing precoding processing on two or more integer transmission data sets, and receives the transmission signals from a transmission apparatus (for example, a transmission apparatus 1A of FIG. 14) that outputs the transmission signals simultaneously or substantially simultaneously in an identical frequency band.

The signal separating unit 420A performs inverse transform for the precoding processing on the received transmission signals, and thereby separates as many reception data sets as the number of the transmission data sets from the transmission signals.

The transmission signal estimating unit 440A estimates a signal distortion component and a noise component due to the clipping processing and an interference component between the transmission signals, based on the reception data set and gain information related to a channel for transmitting the transmission signals, and estimates the transmission data sets by removing the estimated signal distortion component, noise component, and interference component from the reception data sets.

Figure 14:
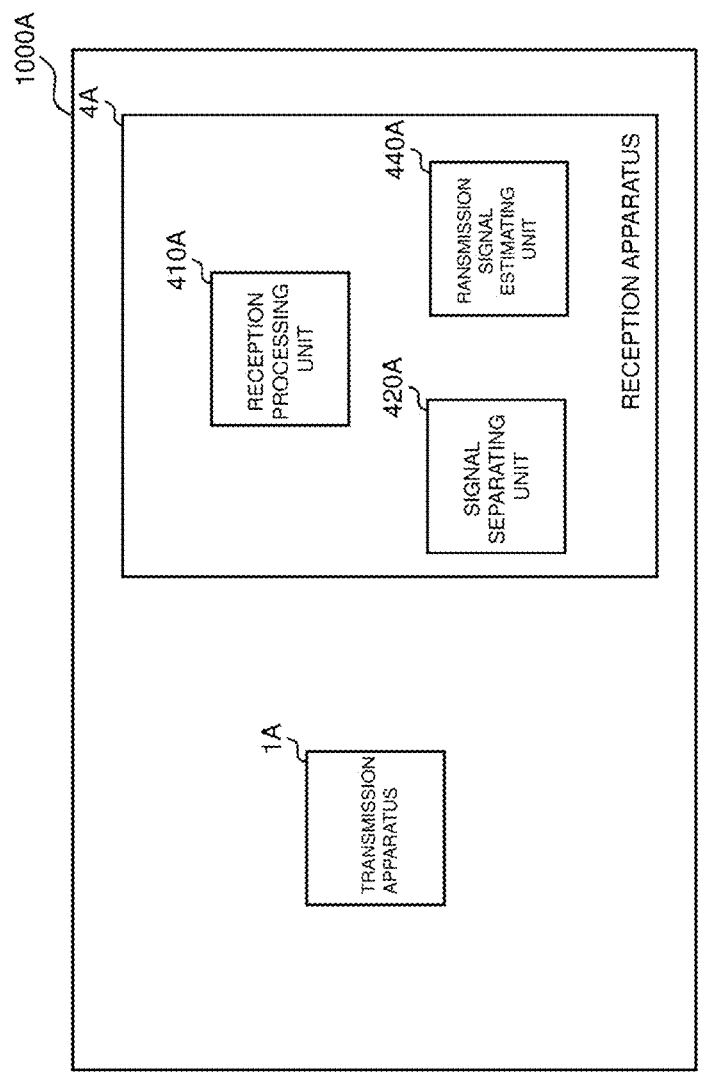
FIG. 14 is a block diagram illustrating an example of a schematic configuration of a transmission and reception system according to the second example embodiment.

FIG. 14 is a block diagram illustrating an example of a schematic configuration of a transmission and reception system 1000A according to the second example embodiment of the present disclosure. The transmission and reception system 1000A includes the transmission apparatus 1A and the reception apparatus 4A.

RELATIONSHIP WITH FIRST EXAMPLE EMBODIMENT

As an example, the reception apparatus 4A according to the second example embodiment may execute operation of the reception apparatus 4 according to the first example embodiment. In the case described above, description regarding the first example embodiment can also be applied to the second example embodiment. Note that the second example embodiment is not limited to the example described above.

4. OTHER EXAMPLE EMBODIMENTS

Descriptions have been given above of the example embodiments of the present disclosure. However, the present disclosure is not limited to these example embodiments. It should be understood by those of ordinary skill in the art that these example embodiments are merely examples and that various alterations are possible without departing from the scope and the spirit of the present disclosure.

For example, the steps in the processing described in the Specification may not necessarily be executed in time series in the order described in the corresponding flowchart. For example, the steps in the processing may be executed in an order different from that described in the corresponding flowchart or may be executed in parallel. Some of the steps in the processing may be deleted, or more steps may be added to the processing.

An apparatus including constituent elements (for example, elements corresponding to the reception processing unit 410, the signal separation processing unit 420, and the transmission signal estimating unit 440) of the reception apparatus 4 described in the Specification may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present disclosure.

The whole or part of the example embodiments disclosed above can be described as, but not limited to, the following supplementary notes.

(Supplementary Note 1)

A reception apparatus comprising:

a reception processing unit configured to receive transmission signals from a transmission apparatus, the transmission apparatus performing clipping processing for removing amplitude equal to or larger than a threshold on the transmission signals generated by performing precoding processing on two or more integer transmission data sets and outputting a plurality of the transmission signals simultaneously or substantially simultaneously in an identical frequency band;

a signal separating unit configured to separate as many reception data sets as number of the transmission data sets from the transmission signals by performing inverse transform for the precoding processing on the received transmission signals; and a transmission signal estimating unit configured to estimate a signal distortion component and a noise component due to the clipping processing and an interference component between the transmission signals based on the reception data sets and gain information related to a channel for transmitting the transmission signals, and estimate the transmission data sets by removing the signal distortion component, the noise component, and the interference component being estimated from the reception data sets.

(Supplementary Note 2)

The reception apparatus according to supplementary note 1, wherein the transmission signal estimating unit comprises:

a first estimation signal output unit configured to output a first estimation value of the transmission data sets, based on the reception data sets and the gain information;

a first correction signal output unit configured to estimate a first difference data set indicating the signal distortion component and the noise component based on the first estimation value and the gain information, estimate a first interference signal indicating the interference component based on the first difference data set and the gain information, and output a first correction signal for correcting the reception data sets based on the first difference data set and the first interference signal;

a second estimation signal output unit configured to output a second estimation value of the transmission data sets, based on a first added signal obtained by adding the first correction signal to the reception data sets and the gain information;

a second correction signal output unit configured to estimate a second difference data set indicating the signal distortion component and the noise component based on the second estimation value and the gain information, estimate a second interference signal indicating the interference component based on the second difference data set and the gain information, and output a second correction signal for correcting the reception data sets based on the second difference data set and the second interference signal; and a third estimation signal output unit configured to output a third estimation value of the transmission data sets, based on a second added signal obtained by adding the second correction signal to the reception data sets and the gain information.

(Supplementary Note 3)

The reception apparatus according to supplementary note 2, wherein the first estimation signal output unit comprises:

a first estimation information calculation unit configured to calculate first estimation information related to the transmission signals, based on the reception data sets, the gain information, and a first parameter being a positive real number; and a first estimation information transform unit configured to transform the first estimation information into the first estimation value by using a second parameter being a real number other than zero and a third parameter being a polynomial with a degree of a positive integer, the second estimation signal output unit comprises:

a second estimation information calculation unit configured to calculate second estimation information related to the transmission signals, based on the first correction signal, the gain information, and the first parameter; and a second estimation information transform unit configured to transform the second estimation information into the second estimation value by using the second parameter and the third parameter, and the third estimation signal output unit comprises:

a third estimation information calculation unit configured to calculate third estimation information related to the transmission signals, based on the second correction signal, the gain information, and the first parameter; and a third estimation information transform unit configured to transform the third estimation information into the third estimation value by using the second parameter and the third parameter.

(Supplementary Note 4)

The reception apparatus according to supplementary note 3, wherein the second parameter and the third parameter are each a parameter determined through learning using backpropagation.

(Supplementary Note 5)

The reception apparatus according to any one of supplementary notes 2 to 4, wherein the first correction signal output unit comprises:

a first difference processing unit configured to perform the precoding processing and the clipping processing on the first estimation value, and then calculate the first difference data set based on an element obtained by separating a signal component combined for the first estimation value in the precoding processing and the first estimation value;

a first interference signal calculation unit configured to calculate the first interference signal, based on the first difference data set and the gain information; and a first correction signal calculation unit configured to calculate the first correction signal, based on the first estimation value, the first interference signal, and the gain information, and the second correction signal output unit comprises:

a second difference processing unit configured to perform the precoding processing and the clipping processing on the second estimation value, and then calculate the second difference data set based on an element obtained by separating a signal component combined for the second estimation value in the precoding processing for the second estimation value and the second estimation value;

a second interference signal calculation unit configured to calculate the second interference signal, based on the second difference data set and the gain information; and a second correction signal calculation unit configured to calculate the second correction signal, based on the second estimation value, the second interference signal, and the gain information.

(Supplementary Note 6)

The reception apparatus according to any one of supplementary notes 1 to 5, wherein the threshold is a predetermined numerical value, and the clipping processing is processing of replacing the amplitude of a signal to the predetermined numerical value without changing phase when the amplitude of the signal exceeds the predetermined numerical value.

(Supplementary Note 7)

The reception apparatus according to any one of supplementary notes 1 to 6, further comprising:

an antenna unit in which a plurality of antenna elements are concentrically disposed, wherein the reception processing unit is configured to receive the transmission signals through the antenna unit.

(Supplementary Note 8)

A transmission and reception system comprising:

the reception apparatus according to any one of supplementary notes 1 to 6; and the transmission apparatus.

(Supplementary Note 9)

A signal processing method comprising:

receiving transmission signals from a transmission apparatus, the transmission apparatus performing clipping processing for removing amplitude equal to or larger than a threshold on the transmission signals generated by performing precoding processing on two or more integer transmission data sets and outputting a plurality of the transmission signals simultaneously or substantially simultaneously in an identical frequency band;

separating as many reception data sets as number of the transmission data sets from the transmission signals by performing inverse transform for the precoding processing on the received transmission signals; and estimating a signal distortion component and a noise component due to the clipping processing and an interference component between the transmission signals based on the reception data sets and gain information related to a channel for transmitting the transmission signals, and estimating the transmission data sets by removing the signal distortion component, the noise component, and the interference component being estimated from the reception data sets.

(Supplementary Note 10)

A signal processing program causing a processor to execute:

receiving transmission signals from a transmission apparatus, the transmission apparatus performing clipping processing for removing amplitude equal to or larger than a threshold on the transmission signals generated by performing precoding processing on two or more integer transmission data sets and outputting a plurality of the transmission signals simultaneously or substantially simultaneously in an identical frequency band;

separating as many reception data sets as number of the transmission data sets from the transmission signals by performing inverse transform for the precoding processing on the received transmission signals; and estimating a signal distortion component and a noise component due to the clipping processing and an interference component between the transmission signals based on the reception data sets and gain information related to a channel for transmitting the transmission signals, and estimating the transmission data sets by removing the signal distortion component, the noise component, and the interference component being estimated from the reception data sets.

A reception apparatus, a transmission and reception system, a signal processing method, and a signal processing program that can achieve both of reduction of peak power and reduction of a transmission rate are provided.

What is claimed is:

1. A reception apparatus comprising:
a memory storing instructions; and
one or more processors configured to execute the instructions to:
receive transmission signals from a transmission apparatus, the transmission apparatus performing clipping processing for removing an amplitude equal to or larger than a threshold on the transmission signals generated by performing precoding processing on two or more integer transmission data sets and outputting the transmission signals simultaneously or substantially simultaneously in an identical frequency band;
separate as many reception data sets as a number of the transmission data sets from the transmission signals by performing an inverse transform for the precoding processing on the received transmission signals; and
estimate a signal distortion component and a noise component due to the clipping processing and an interference component between the transmission signals based on the reception data sets and gain information related to a channel for transmitting the transmission signals, and estimate the transmission data sets by removing the signal distortion component, the noise component, and the interference component being estimated from the reception data sets.

2. The reception apparatus according to claim 1, wherein the one or more processors are configured to execute the instructions to:
output a first estimation value of the transmission data sets, based on the reception data sets and the gain information;
estimate a first difference data set indicating the signal distortion component and the noise component based on the first estimation value and the gain information, estimate a first interference signal indicating the interference component based on the first difference data set and the gain information, and output a first correction signal for correcting the reception data sets based on the first difference data set and the first interference signal;
output a second estimation value of the transmission data sets, based on a first added signal obtained by adding the first correction signal to the reception data sets and the gain information;
estimate a second difference data set indicating the signal distortion component and the noise component based on the second estimation value and the gain information, estimate a second interference signal indicating the interference component based on the second difference data set and the gain information, and output a second correction signal for correcting the reception data sets based on the second difference data set and the second interference signal; and
output a third estimation value of the transmission data sets, based on a second added signal obtained by adding the second correction signal to the reception data sets and the gain information.

3. The reception apparatus according to claim 2, wherein the one or more processors are configured to execute the instructions to:
calculate first estimation information related to the transmission signals, based on the reception data sets, the gain information, and a first parameter being a positive real number;
transform the first estimation information into the first estimation value by using a second parameter being a real number other than zero and a third parameter being a polynomial with a degree of a positive integer;
calculate second estimation information related to the transmission signals, based on the first correction signal, the gain information, and the first parameter;
transform the second estimation information into the second estimation value by using the second parameter and the third parameter;
calculate third estimation information related to the transmission signals, based on the second correction signal, the gain information, and the first parameter; and transform the third estimation information into the third estimation value by using the second parameter and the third parameter.

4. The reception apparatus according to claim 3, wherein the second parameter and the third parameter are each determined through learning using backpropagation.

5. The reception apparatus according to claim 2, wherein the one or more processors are configured to execute the instructions to:
perform the precoding processing and the clipping processing on the first estimation value, and then calculate the first difference data set based on an element obtained by separating a signal component combined for the first estimation value in the precoding processing and the first estimation value;
calculate the first interference signal, based on the first difference data set and the gain information;
calculate the first correction signal, based on the first estimation value, the first interference signal, and the gain information;
perform the precoding processing and the clipping processing on the second estimation value, and then calculate the second difference data set based on an element obtained by separating a signal component combined for the second estimation value in the precoding processing for the second estimation value and the second estimation value;
calculate the second interference signal, based on the second difference data set and the gain information; and
calculate the second correction signal, based on the second estimation value, the second interference signal, and the gain information.

6. The reception apparatus according to claim 1, wherein the threshold is a predetermined numerical value, and the clipping processing is processing of replacing the amplitude of a signal to the predetermined numerical value without changing phase when the amplitude of the signal exceeds the predetermined numerical value.

7. The reception apparatus according to claim 1, further comprising:
an antenna in which a plurality of antenna elements are concentrically disposed, wherein
the one or more processors are configured to execute the instructions to receive the transmission signals through the antenna.

8. A signal processing method comprising:
receiving, by a processor controlling a receiving apparatus, transmission signals from a transmission apparatus, the transmission apparatus performing clipping processing for removing an amplitude equal to or larger than a threshold on the transmission signals generated by performing precoding processing on two or more integer transmission data sets and outputting the transmission signals simultaneously or substantially simultaneously in an identical frequency band;
separating, by the processor, as many reception data sets as number of the transmission data sets from the transmission signals by performing inverse transform for the precoding processing on the received transmission signals; and
estimating, by the processor, a signal distortion component and a noise component due to the clipping processing and an interference component between the transmission signals based on the reception data sets and gain information related to a channel for transmitting the transmission signals, and estimating the transmission data sets by removing the signal distortion component, the noise component, and the interference component being estimated from the reception data sets.

9. A non-transitory computer readable recording medium storing a signal processing program that when executed by a processor causes the processor to execute:
receiving transmission signals from a transmission apparatus, the transmission apparatus performing clipping processing for removing an amplitude equal to or larger than a threshold on the transmission signals generated by performing precoding processing on two or more integer transmission data sets and outputting the transmission signals simultaneously or substantially simultaneously in an identical frequency band;
separating as many reception data sets as number of the transmission data sets from the transmission signals by performing inverse transform for the precoding processing on the received transmission signals; and
estimating a signal distortion component and a noise component due to the clipping processing and an interference component between the transmission signals based on the reception data sets and gain information related to a channel for transmitting the transmission signals, and estimating the transmission data sets by removing the signal distortion component, the noise component, and the interference component being estimated from the reception data sets.

* * * * *